(12) United States Patent
Shuey et al.

(10) Patent No.: US 10,166,754 B2
(45) Date of Patent: Jan. 1, 2019

(54) POLYMERIC GRAVURE PRINTING FORM AND PROCESS FOR PREPARING THE SAME WITH CURABLE COMPOSITION HAVING A MULTIFUNCTIONAL URETHANE

(71) Applicant: E I DU PONT DE NEMOURS AND COMPANY, Wilmington, DE (US)

(72) Inventors: Steven W Shuey, Chadds Ford, PA (US); Adrian Lungu, Old Bridge, NJ (US); Mukesh C Shah, Hockessin, DE (US); Garret D Figuly, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/899,464

(22) Filed: Feb. 20, 2018

(65) Prior Publication Data

US 2018/0178503 A1 Jun. 28, 2018

Related U.S. Application Data

(62) Division of application No. 15/078,228, filed on Mar. 23, 2016, now Pat. No. 9,931,830.

(Continued)

(51) Int. Cl.
*B41N 1/22* (2006.01)
*C08G 18/00* (2006.01)
(Continued)

(52) U.S. Cl.
CPC ............ *B41C 1/02* (2013.01); *B41C 1/045* (2013.01); *B41C 1/05* (2013.01); *B41M 1/10* (2013.01);
(Continued)

(58) Field of Classification Search
None
See application file for complete search history.

(56) References Cited

U.S. PATENT DOCUMENTS

| 3,782,961 A | 1/1974 | Takahashi et al. |
| 4,007,680 A | 2/1977 | Pfleger et al. |

(Continued)

FOREIGN PATENT DOCUMENTS

| EP | 2599811 A1 | 6/2013 |
| GB | 1159551 A | 7/1969 |

(Continued)

OTHER PUBLICATIONS

PCT International Search Report for Application No. PCT/US2016/023532; Vogel, Thomas, Authorized Officer; ISA/EPO; dated May 31, 2016.

(Continued)

*Primary Examiner* — Joshua D Zimmerman
(74) *Attorney, Agent, or Firm* — Simon L Xu

(57) ABSTRACT

The invention pertains to a printing form and a process for preparing a polymeric printing form from a curable composition that includes a multifunctional urethane in a specified reactive group equivalent weight range, and an initiator. The process includes coating the curable composition onto a supporting substrate, such as a print cylinder, to form a layer, curing the layer with heat or by exposure to actinic radiation, and engraving the resulting cured layer to form at least one printing cell in the cured layer. The process prepares novel polymeric printing forms, particularly novel polymeric gravure printing forms, having a cured polymer-based composition layer that is engravable, resistant to solvent inks, and capable of printing gravure-quality images. The present invention shortens the time to prepare gravure printing cylinders and removes the need for and disposal of toxic (Continued)

heavy metals such as copper and chrome associated with conventional gravure print cylinder preparation.

15 Claims, 1 Drawing Sheet

Related U.S. Application Data

(60) Provisional application No. 62/141,915, filed on Apr. 2, 2015.

(51) Int. Cl.

| | | |
|---|---|---|
| *C08L 35/02* | (2006.01) | |
| *B41C 1/02* | (2006.01) | |
| *C08F 122/22* | (2006.01) | |
| *C08F 222/22* | (2006.01) | |
| *C08F 290/00* | (2006.01) | |
| *C08K 3/36* | (2006.01) | |
| *C08K 5/10* | (2006.01) | |
| *B41C 1/045* | (2006.01) | |
| *B41C 1/05* | (2006.01) | |
| *B41M 1/10* | (2006.01) | |
| *B41N 1/12* | (2006.01) | |
| *C08G 18/67* | (2006.01) | |

(52) U.S. Cl.
CPC .............. *B41N 1/12* (2013.01); *B41N 1/22* (2013.01); *C08F 122/22* (2013.01); *C08F 222/22* (2013.01); *C08F 290/00* (2013.01); *C08G 18/00* (2013.01); *C08G 18/672* (2013.01); *C08K 3/36* (2013.01); *C08K 5/10* (2013.01); *C08L 35/02* (2013.01); *C08L 2205/06* (2013.01)

(56) References Cited

U.S. PATENT DOCUMENTS

| | | | |
|---|---|---|---|
| 4,168,982 | A | 9/1979 | Pazos |
| 4,225,695 | A | 9/1980 | Schuster et al. |
| 4,384,011 | A | 5/1983 | Aoyama et al. |
| 5,694,852 | A | 12/1997 | Bressler et al. |
| 2004/0221756 | A1 | 11/2004 | Campbell et al. |
| 2013/0145945 | A1 | 6/2013 | Kanchiku et al. |
| 2014/0037874 | A1 | 2/2014 | Subramanian et al. |
| 2014/0135518 | A1 | 5/2014 | Drysdale |
| 2014/0135524 | A1 | 5/2014 | Drysdale |
| 2014/0135535 | A1 | 5/2014 | Drysdale |

FOREIGN PATENT DOCUMENTS

| | | |
|---|---|---|
| GB | 1544748 A | 4/1979 |
| GB | 2071574 B | 9/1984 |
| WO | 2010/003921 A1 | 1/2010 |

OTHER PUBLICATIONS

International Preliminary Report on Patentability, PCT/US2016/023532, Agnes Wittmann Regis, Authorized Officer, IB, 12102017.
Database, "Radcure Uv/Eb Energy Curable Resins Product guide", Allnex, 2014.

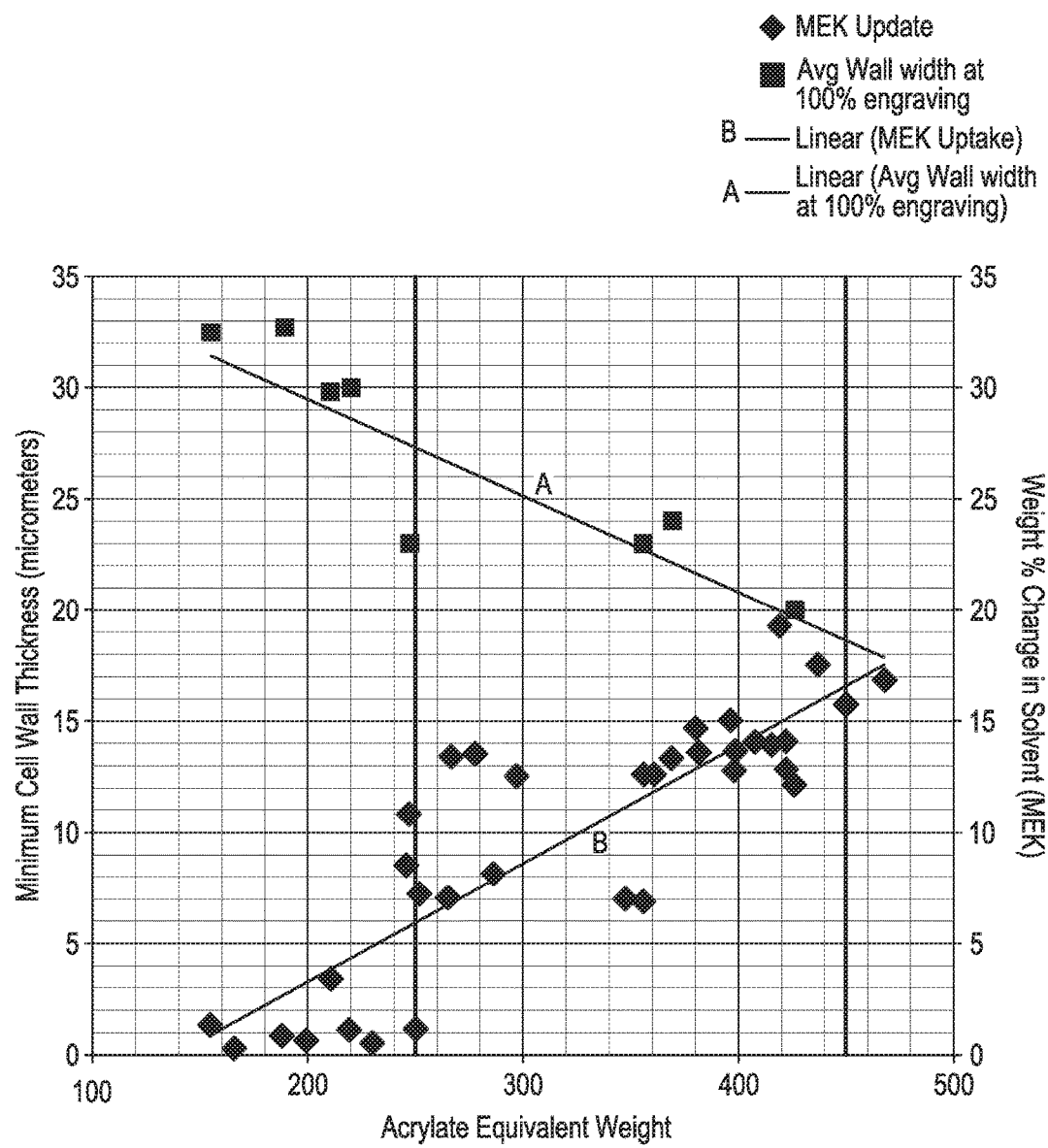

POLYMERIC GRAVURE PRINTING FORM AND PROCESS FOR PREPARING THE SAME WITH CURABLE COMPOSITION HAVING A MULTIFUNCTIONAL URETHANE

CROSS-REFERENCE TO RELATED APPLICATIONS

This application is a divisional of U.S. application Ser. No. 15/078,228, filed Mar. 23, 2016 and claims benefit of U.S. Provisional Patent Application Ser. No. 62/141,915 filed Apr. 2, 2015. Each of said applications is incorporated herein for all purposes by reference thereto.

BACKGROUND OF THE INVENTION

1. Field of the Invention

This invention pertains to a printing form and a process for preparing a printing form, and in particular, a process for preparing a polymeric gravure printing form in which one or more conventional metal layers are replaced by a curable layer of a specified multifunctional urethane.

2. Description of Related Art

Gravure printing is a method of printing in which the printing form prints from an image area, where the image area is depressed and consists of small recessed cups or wells, typically referred to as cells, to contain the ink or printing material, and the non-image area is the surface of the form. Gravure printing is particularly well suited for printing great numbers of copies of a desired image precisely and rapidly on a substrate and is widely used to print various articles, such as labels, flexible food packaging, wrapping paper, wall paper, boxes and cartons. A gravure cylinder, for example, is essentially made by electroplating a copper layer onto a base roller, and then engraving the image composed of the small recessed cells or wells digitally by a diamond stylus or laser etching machine. The cylinder with engraved cells is then mechanically ground and polished and overplated with a very thin layer of chrome to impart durability during the printing process. Consequently, metal gravure printing forms are expensive and require considerable time and material to produce. Furthermore, electroplating and etching processes used to produce metal gravure printing forms have pollution problems, since they generate considerable hazardous heavy metal wastes, and require costly waste disposal and regulatory permitting to operate.

Replacing the electroplated copper and chrome layers with a polymer-based composition has been explored, for example, by Aoyama et al. (U.S. Pat. No. 4,384,011), Bressler et al. (U.S. Pat. No. 5,694,852), Campbell and Belser (U.S. Patent Publication 2004/0221756), and Kellner and Sahl (UK Patent Application GB 2,071,574). However, a combination of several process and property requirements must be met for gravure printing forms having a polymer-based composition to succeed. For an economical process, a polymer-based coating needs to be applied to the cylinder easily ("coatability") and cured reasonably rapidly ("curability"), allowing a high-quality surface layer to be produced to the strict tolerances required for gravure engraving and printing with a minimal requirement for grinding and polishing. The surface layer needs to have a level of hardness that produces well defined print cell structure when engraved, without significant chipping or breaking ("engravability"). The surface layer also needs to possess excellent resistance to the solvents used in gravure printing inks and cleaning solutions ("durability—solvent resistance"). Also, the surface layer needs to resist the mechanical wear ("durability—mechanical wear" and "scratch resistance") encountered during the printing process. e.g., wear from the scraping of the doctor blade, wear from any abrasive particles that may be in the ink, and wear from the surface onto which the image is printed. Further, in order for gravure printing forms having a polymer-based composition to replace conventional metal-covered gravure printing forms, the polymer-based printing forms should be capable of relatively long print runs and provide a consistent printed image for a minimum of 100,000 impressions, and preferably at least 200,000 or more impressions. It is also desirable after printing with polymer-based printing forms for end users to be able to easily remove the polymeric layer so that the base support or cylinder can be reused.

As a consequence, there remains a need to identify specific polymer-based compositions with the desired combination of coatability, curability, and engravability that can be used to produce, in an economical and environmentally-friendly manner, a polymeric printing form precursor; and, for a polymeric printing form having the appropriate combination of solvent resistance, mechanical wear resistance, and print quality. It is also desirable for the polymeric layer to be easy to remove after use.

SUMMARY OF THE INVENTION

An embodiment provides a process for preparing a printing form including: a) applying a layer of a curable composition comprising a multifunctional urethane, and an initiator, and optionally a reactive diluent, wherein the curable composition has an reactive group equivalent weight between 250 and 450 g/equivalent, based upon the weighted average of the multifunctional urethane and the optional reactive diluent if present, onto a supporting substrate; b) exposing the layer of the curable composition to actinic radiation or heat to form a cured layer; and c) engraving at least one cell in the cured layer resulting from step b).

Another embodiment provides that the multifunctional urethane has two or more ethylenically unsaturated groups, and the curable composition further comprises one or more reactive diluents having two or more ethylenically unsaturated groups, and the reactive group equivalent weight of the curable composition is the weighted average of the reactive group equivalent weights of the one or more reactive diluents and the multifunctional urethane, and is between 250 and 450 g/equivalent.

Another embodiment provides that the multifunctional urethane is a multifunctional acrylated urethane having two or more (meth)acrylate groups, and the reactive group equivalent weight is an acrylate equivalent weight that is between 250 and 450 g/equivalent.

Another embodiment provides that the curable composition further comprises one or more resin modifiers independently selected from the reactive diluent, monofunctional diluents, monomers, auxilliary resin modifying compounds, or combinations thereof.

Another embodiment provides that the multifunctional urethane comprises one or more multifunctional acrylated urethanes having two or more (meth)acrylate groups, the initiator is a photoinitiator; and the optional reactive diluent comprises one or more reactive diluents having two or more (meth)acrylate groups, and the reactive group equivalent weight of the composition is an acrylate equivalent weight that is the weighted average of the acrylate equivalent weights of the one or more reactive diluents and the multifunctional acrylated urethane, and is between 250 and 450 g/equivalent.

Another embodiment provides that the multifunctional urethane comprises one or more multifunctional acrylated urethanes having two or more (meth)acrylate groups, at least one reactive diluent having two or more (meth)acrylate groups, and an auxilliary resin modifying compound having two or more (meth)acrylate groups, and wherein the reactive group equivalent weight of the curable composition is an acrylate equivalent weight that is the weighted average of the acrylate equivalent weights of the one or more multifunctional acrylated urethanes, the at least one reactive diluent, and the auxilliary resin modifying compound, and is between 250 and 450 g/equivalent.

Another embodiment provides that the curable composition further comprises at least one reactive diluent that has a viscosity of less than or equal to 300 cp and is selected from the group of difunctional (meth)acrylate monomers, difunctional (meth)acrylate oligomers, trifunctional (meth)acrylate monomers, trifunctional (meth)acrylate oligomers, and combinations thereof.

Another embodiment provides that the curable composition further comprises a particulate filler selected from nanoparticles, microparticles, or combinations thereof.

Another embodiment provides that the curable composition further comprises one or more additives selected from adhesion promotors, slip agents, flow and leveling agents, wetting agents, plasticizers, flexibilizing agents, stabilizers, antioxidants, dispersants, dyes, and pigments.

Another embodiment provides that the supporting substrate is in the form of a cylinder or sheet.

Another embodiment provides that the supporting substrate is a gravure print cylinder.

Another embodiment provides that the applying step comprises coating the curable composition having a viscosity between 200 to 20000 cp to form a layer having a thickness between 50.8 and 3810 micrometers.

Another embodiment provides that the curable composition for the coating step is selected from spin coating, dip coating, slot die coating, roller coating, extrusion coating, brush coating, ring coating, powder coating, and blade coating.

Another embodiment provides that the exposing step b) comprises heating the curable composition layer to a temperature between 30° C. to 252° C.

Another embodiment provides that the initiator is a photoinitiator and the exposing step b) comprises exposing the curable composition layer to actinic radiation selected from ultraviolet radiation, visible radiation, and electron-beam radiation.

Another embodiment provides that the actinic radiation is ultraviolet radiation having an energy density between 1000 and 30000 mJoules/cm$^2$.

Another embodiment provides that after the exposing step, the process further comprising polishing an exterior surface of the cured layer that is opposite the supporting substrate providing the exterior surface with an Rz value less than 2.54 micron.

Another embodiment provides that the engraving step is selected from electromechanical engraving or laser engraving.

Another embodiment provides that after the exposing step the cured layer of the composition has a hardness of 30 to 200 megaPascals.

Another embodiment provides that after the exposing step, the cured layer of the composition has a hardness equal to or greater than 40 megaPascals.

Another embodiment provides a process for gravure printing with a printing form including: a) preparing the printing form having a cured layer according to the process described above; b) applying an ink to the at least one cell; and c) transferring ink from the cell to a printable substrate, wherein the cured layer swells 15% based on weight of the layer.

Another embodiment provides a printing form comprising a supporting substrate and a print surface adjacent to the supporting substrate, wherein the print surface is a cured layer of a curable composition comprising a multifunctional urethane, and an initiator, and optionally a reactive diluent, wherein the composition is characterized by a reactive group equivalent weight of the multifunctional urethane and the optional reactive diluent that is between 250 and 450 g/equivalent.

Another embodiment provides that the curable composition on the print surface further comprises one or more of the following optional components that are independently selected from: particulate filler selected from nanoparticles, microparticles, or a combination thereof; one or more resin modifiers selected from monofunctional diluents, monomers, auxilliary resin modifying compounds or combinations thereof; and additives that are selected from adhesion promotors, slip agents, flow and leveling agents, wetting agents, plasticizers, flexibilizing agents, stabilizers, antioxidants, dipersants, dyes, pigments or combinations thereof.

Another embodiment provides that the printing surface includes engraved cells for ink.

Another embodiment provides that the printing form is a polymer-based gravure printing form.

Another embodiment provides that the printing form is copper and/or chromium free.

Another embodiment provides that the cured layer forming the print surface has a hardness of about 30 to 200 megaPascals.

Another embodiment provides that the cured layer forming the print surface has a hardness of greater than or equal to 40 megaPascals.

Another embodiment provides a printing form precursor including: a supporting substrate; and a layer of a curable composition adjacent to the supporting substrate, wherein the curable composition comprises a multifunctional urethane, and an initiator, and optionally a reactive diluent, wherein the curable composition has reactive group equivalent weight between 250 and 450 g/equivalent, based upon the multifunctional urethane and the optional reactive diluent.

Another embodiment provides that the multifunctional urethane comprises one or more multifunctional acrylated urethanes having two or more (meth)acrylate groups, and the composition further comprises at least one reactive diluent having two or more (meth)acrylate groups, and an auxilliary resin modifying compound having two or more (meth)acrylate groups, wherein the reactive group equivalent weight of the composition is an acrylate equivalent weight that is the weighted average of the acrylate equivalent weights of the one or more multifunctional acrylated urethanes, the at least one reactive diluent, and the auxilliary resin modifying compound, that is between 250 and 450 g/equivalent.

Another embodiment provides that the multifunctional urethane is a homopolymer of a urethane oligomer or monomer.

Another embodiment provides that the multifunctional urethane is a copolymer of a urethane oligomer or monomer, and another polymer having at two or more reactive groups and selected from polyester oligomers, polyester monomers, epoxy oligomers, epoxy monomers, and polyether oligomers, or polyether monomers, wherein the multifunctional urethane oligomer or monomer is at least 50 wt % of the copolymer.

Another embodiment provides the multifunctional urethane is a multifunctional acrylated urethane comprising a blend of at least one soft multifunctional acrylated urethane and at least one hard multifunctional acrylated urethane.

Another embodiment provides that the curable composition of the printing form precursor further comprises at least one reactive diluent that has two or more reactive groups and a viscosity of less than or equal to 300 cp and is selected from difunctional (meth)acrylate monomers, difunctional (meth)acrylate oligomers, trifunctional (meth)acrylate monomers, trifunctional (meth)acrylate oligomers, and combinations thereof.

Another embodiment provides that the curable composition of the printing form precursor includes at least one reactive diluent selected from vinyl ethers; n-tricyclodecane dimethanol diacrylate (TCDDA); hexamethylene diol diacrylate (HDDA); butanediol diacrylate (BDDA); dipropylene glycol diacrylate (DPGDA); trimethylol propane triacrylate (TMPT); ethoxylated trimethylol propane triacrylate (et-TMPT); and trimethylpropane trimethacrylate (TMPTMA).

Another embodiment provides that the optional reactive diluent is present in an amount from 0.2 to 40 wt %, based on the total weight of the components of the curable composition.

Another embodiment provides that the curable composition of the printing form precursor further comprises one or more resin modifiers independently selected from monofunctional diluents, monomers, an auxilliary resin modifying compounds, or combinations thereof.

Another embodiment provides that the curable composition of the printing form precursor further comprises one or more monofunctional diluents having one reactive group and a viscosity less than 1100 cp at room temperature, and wherein the one or more monofunctional diluents is in an amount from 0.2 to 20 wt %, based on the total weight of the components of the curable composition.

Another embodiment provides that the curable composition of the printing form precursor further comprises one or more monomers having a viscosity greater than 300 cp at room temperature, and wherein the one or more monomers is in an amount from 0.2 to 20 wt %, based on the total weight of the components of the curable composition.

Another embodiment provides that the curable composition of the printing form precursor further comprises one or more auxilliary resin modifying compounds that is independently selected from monomers and oligomers of epoxy (meth)acrylates; monomers and oligomers of polyester (meth)acrylates; monomers and oligomers of polyether (meth)acrylates; acrylate derivatives and methacrylate derivatives of isocyanates; and combinations thereof, and wherein the one or more auxilliary resin modifying compounds is in an amount from 0.2 to 35 wt %, based on the total weight of the components of the curable composition.

Another embodiment provides that the initiator is a photoinitiator that is responsive to actinic radiation selected from ultraviolet radiation, visible radiation, and electron-beam radiation.

Another embodiment provides that the initiator is a thermal initiator that is responsive to heat at a temperature between 30° C. to 252° C.

Another embodiment provides that the curable composition of the printing form precursor comprises 30 to 95 wt % of the multifunctional urethane, 0.1 to 40 wt % of one or more reactive diluents, and 0.1 to 15 wt % of the initiator, based on the total of solid components in the curable composition.

Another embodiment provides that the curable composition of the printing form precursor further comprises a particulate filler selected from nanoparticles, microparticles, or combinations thereof.

Another embodiment provides that the curable composition of the printing form precursor further comprises 0.1 to 55 wt % of particulate filler based on the total solid components in the curable composition, wherein the particulate filler is selected from aluminum oxides, silicas, zinc oxides, zirconium oxides, titanium oxides, magnesium oxides, tungsten oxides, tungsten carbides, silicon carbides, titanium carbides, boron nitrides, molybdenum disulfides, clays, carbon nanotubes, graphites, carbon blacks, carbon filaments, poly(tetrafluoroethylene), or combinations thereof.

Another embodiment provides that the curable composition of the printing form precursor further comprises particulate filler that is functionalized and selected from alumina particles, silica particles, and zirconia particles.

Another embodiment provides that the particulate filler is functionalized with phenyl-functionalized silanes, epoxy functionalized silanes, or vinyl functionalized silanes.

Another embodiment provides that the curable composition of the printing form precursor further comprises particulate fillers selected from carbon nanotubes, graphites, carbon blacks, carbon filaments, carbon encapsulated silicas, or mixtures thereof, and is in an amount of from 1 to 30 wt %, based on the total of solid components in the curable composition.

Another embodiment provides that the curable composition of the printing form precursor further comprises particulate filler in an amount of 1 to 35 wt % of nanoparticles.

Another embodiment provides that the curable composition of the printing form precursor further comprises particulate filler in an amount of 1 to 20 wt % of microparticles.

Another embodiment provides that the curable composition of the printing form precursor further comprises one or more additives that is selected from adhesion promotors, slip agents, flow and leveling agents, wetting agents, slip agents, plasticizers, flexibilizing agents, stabilizers, antioxidants, or combinations thereof.

Another embodiment provides that the one or more additives in total is present at equal to or less than 10 wt %, based on the total of solid components in the curable composition.

Another embodiment provides that the slip agent is selected from acrylated silicone polyether copolymers and fluorinated compounds.

Another embodiment provides that the curable composition of the printing form precursor further comprises 1 to 30 wt % of one or more dyes and/or pigments.

Another embodiment provides that the printing form precursor comprising: a) 30 to 95 wt % of at least one multifunctional urethane having two or more ethylenically unsaturated groups, and an ethylenically unsaturated equivalent weight; b) 0.1 to 10 wt % of at least one initiator; c) 0.2 to 40 wt % of one or more reactive diluents having two or more ethylenically unsaturated groups, and having an ethylenically unsaturated equivalent weight; d) 0 to 55 wt % of particulate filler selected from nanoparticles, microparticles, and combinations thereof; and, optionally, one or more of additives independently selected from adhesion promotors, slip agents, flow and leveling agents, wetting agents, plasticizers, flexibilizing agents, stabilizers, antioxidants, dispersants, dyes, or pigments, wherein the wt % of each component is based on the total of the solid components in the curable composition, and wherein the reactive group equivalent weight of the curable composition is a weighted average of ethylenically unsaturated equivalent weight of the at least one multifunctional urethane and the one or more reactive diluents and is 250 to 450 g/equivalent.

Another embodiment provides that the printing form precursor comprising: a) 30 to 95 wt % total of the multifunctional urethane that is one or more acrylated urethanes having two or more (meth)acrylate groups; b) 0.1 to 10 wt % total of the initiator that is one or more of photoinitiators; c) 0.2 to 40 wt % total of one or more reactive diluents having two or more (meth)acrylate groups; d) 1 to 45 weight percent of particulate filler selected from nanoparticles, microparticles, and combinations thereof; and, optionally, up to 10 wt % total of one or more of additives independently selected from adhesion promotors, slip agents, flow and leveling agents, wetting agents, plasticizers, flexibilizing agents, stabilizers, antioxidants, or dispersants; wherein the wt % is based on the total of the solid components in the curable composition, and wherein the reactive group equivalent weight of the curable composition is a weighted average of (meth)acrylate equivalent weight of the one or more acrylated urethanes and the one or more reactive diluents, and is 250 to 450 g/equivalent.

Another embodiment provides that the curable composition of the printing form precursor further comprises e) 0 to 20 wt % of one or more monofunctional diluents; f) 0 to 20 wt % of one or more monomers; g) 0 to 35 wt % of one or more auxilliary resin modifying compounds; wherein the total of the reactive diluents, the monofunctional diluents, the monomers, and the auxiliary resin modifying compounds is less than or equal to 40 wt % of the curable composition.

Another embodiment provides that the printing form precursor comprising: a) 30 to 70 wt % total of the multifunctional urethane that is one or more acrylated urethanes having two or more (meth)acrylate groups; b) 0.1 to 10 wt % total of the initiator that is one or more of photoinitiators; c) 0.2 to 35 wt % total of one or more reactive diluents having two or more (meth)acrylate groups; d) 1 to 50 weight percent of particulate filler selected from nanoparticles, microparticles, and combinations thereof; and, optionally, 0 to 5 wt % of an adhesion promotor; optionally 0 to 5 wt % of a flow additive; optionally, 0 to 2 wt % of a stabilizer; and optionally, 0 to 3 wt % of a slip agent; wherein the wt % is based on the total of the solid components present of the composition.

Another embodiment provides that the curable composition of the printing form precursor forms a cured layer that has a hardness of at least 30 megaPascals on a supporting substrate, the layer having an exterior surface capable of forming cells to carry ink thereby creating the printing surface.

Yet another embodiment provides a curable multifunctional urethane polymer for use as a printing surface in a printing form comprising: a) 30 to 95 wt % of at least one multifunctional urethane having two or more reactive groups; b) 0.1 to 10 wt % of at least one initiator; c) 0 to 40 wt % of one or more reactive diluents having two or more reactive groups; d) 0 to 20 wt % of one or more monofunctional diluents; e) 0 to 20 wt % of one or more monomers; f) 0 to 35 wt % of one or more auxilliary resin modifying compounds; wherein the total of the reactive diluents, monofunctional diluents, monomers, and auxilliary resin modifying compounds is no more than 40 wt % of the curable composition; g) 0 to 55 wt % of particulate filler selected from nanoparticles, microparticles, and combinations thereof; and, optionally, upto 10 wt % total of one or more of additives independently selected from adhesion promotors, slip agents, flow and leveling agents, wetting agents, plasticizers, flexibilizing agents, stabilizers, antioxidants, or dispersants; wherein the wt % is based on the total of the solid components in the curable composition; wherein the curable composition has a reactive group equivalent weight of the at least one multifunctional urethane and the one or more reactive diluents and, is 250 to 450 g/equivalent, wherein the curable composition forms a cured layer that has a hardness of at least 30 megaPascals on a supporting substrate, the layer having an exterior surface capable of forming cells to carry ink thereby creating the printing surface.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

BRIEF DESCRIPTION OF THE DRAWINGS

Various features and/or embodiments of this invention are illustrated in drawings as described below. These features and/or embodiments are representative only, and the selection of these features and/or embodiments for inclusion in the drawings should not be interpreted as an indication that subject matter not included in the drawings is not suitable for practicing the invention, or that subject matter not included in the drawings is excluded from the scope of the appended claims and equivalents thereof.

FIG. 1 is a graphical representation of data obtained in Examples 8 through 43, illustrating one embodiment of the present invention that shows the effect of acrylate equivalent weight (EW) of specified cured compositions of Examples 8 through 43 containing acrylated urethane oligomers and reactive diluents (if present) on solvent resistance and cell engravability. The acrylate equivalent weight is determined without taking into account monofunctional components. The solvent resistance of the cured compositions in methyl ethyl ketone (MEK) were tested and plotted in FIG. 1 as weight % change on a vertical axis relative to the acrylate equivalent weight of the composition. Line A is the result of a linear regression analysis of the data for the solvent resistance relative to the acrylate equivalent weight of the acrylated urethane oligomers and reactive diluents. The cell engravability of the cured compositions of Examples 8 through 43 were tested by measuring wall thickness of engraved cells and plotted in FIG. 1 as a minimum average cell wall thickness (in micrometers) on another vertical axis relative to the acrylate equivalent weight of the composition. Line B is the result of a linear regression analysis of the data for the cell engravability relative to the acrylate equivalent weight of the acrylated urethane oligomers and reactive diluents. The region between a range of the acrylate equivalent weights of about 250 and about 450 represents cured compositions containing acrylated urethanes and optional reactive diluents, which had desired performance for both solvent resistance and cell engravability.

DESCRIPTION OF THE PREFERRED EMBODIMENTS

In the context of this disclosure, a number of terms shall be utilized.

The term "multifunctional urethane" means at least one uncross-linked monomer or oligomer containing urethane linkages and two or more polymerizable functionalities, wherein the polymerizable functionality is an ethylenically unsaturated group. In most embodiments, the multifunctional urethane is at least one uncross-linked monomer or oligomer containing urethane linkages and two or more (meth)acrylate functionalities as the ethylenically unsaturated groups. In addition to the urethane linkages and the two or more polymerizable functionalities, the multifunctional urethane can include other polymeric linkages. A "acrylated urethane", "urethane acrylate", or "urethane acrylate resin" or "multifunctional acrylated urethane" is a multifunctional urethane that has two or more (meth)acrylated groups.

The term "urethane component" refers to all multifunctional urethanes present.

The term "ethylenically unsaturated" refers to a group on a compound that contains a carbon-carbon double bond that can undergo addition polymerization to form carbon-carbon chains. In some cases, an unsaturated compound that contains a carbon-carbon triple bond can undergo addition polymerization to form carbon-carbon chains, and thus is encompassed within "ethylenically unsaturated".

The term "multifunctional," with reference to a multifunctional urethane, means a urethane monomer or oligomer having two or more polymerizable groups per molecule, i.e., two or more ethylenically unsaturated groups per molecule.

The term "multifunctional," with reference to acrylated urethane or multifunctional acrylated urethane, means a urethane monomer or oligomer having two or more (meth)acrylate functionalities (as the polymerizable group) per molecule.

The term "multifunctional," with reference to a reactive diluent, means having two or more polymerizable functionalities, i.e., ethylenically unsaturated groups, per molecule. In some embodiments, a multifunctional reactive diluent is a reactive diluent having two or more (meth)acrylate functionalities per molecule.

The term "(meth)acrylate" means acrylate or methacrylate.

The term "(meth)acrylic acid" means acrylic acid or methacrylic acid.

The term "reactive diluent" refers to a low viscosity material that is used to modify the viscosity and other properties, such as, wetting and impregnation, of a resin or polymer that is to be cured; and, includes polymerizable groups, i.e., ethylenically unsaturated groups, such as, for example, (meth)acrylate functional groups. Unlike a solvent, the reactive diluent becomes part of the final cured composition. The reactive diluent includes two or more polymerizable groups. Herein, the term "diluent" may be used for brevity in place of "reactive diluent."

The term "molecular weight" means the weight average molecular weight, unless described otherwise in the specification.

The term "reactive group equivalent weight" ((RGEW) or (REW)) means the weight in grams of at least one multifunctional urethane, or mixture of multifunctional urethanes, that contains 1 gram equivalent of reactive functional groups. Thus, the reactive group equivalent weight is the molecular weight of the urethane oligomer divided by the number of ethylenically unsaturated functional groups on the urethane and can be expressed by unit of gram/equivalent. The reactive group equivalent weight can also be used in reference to a reactive diluent, and thus means the weight in grams of at least one reactive diluent, or a mixture of reactive diluents, that contains 1 gram equivalent of reactive functional groups. Thus the reactive group equivalent weight is the molecular weight of the reactive diluent divided by the number of ethylenically unsaturated functional groups on the reactive diluent. The term reactive group equivalent weight takes into account the effect of multifunctional reactive diluents if present. For curable compositions containing more than one multifunctional urethane, and optionally, one or more reactive diluents, the reactive group equivalent weight (RGEW) of the curable composition is the weighted average RGEW of each of the multifunctional urethanes, and if present, the one or more reactive diluents, based on the total of the multifunctional urethanes and reactive diluents present. The reactive group equivalent weight is an indicator of the crosslinking density of the curable composition.

The term "acrylate equivalent weight" ((EW) or (AEW)) means the weight in grams of at least one multifunctional urethane, or mixture of multifunctional urethanes, that contains 1 gram equivalent of acrylate functional groups. Thus, the acrylate equivalent weight is the molecular weight of the urethane oligomer divided by the number of (meth)acrylate functional groups on the urethane, and can be expressed by unit of gram/equivalent. The acrylate equivalent weight can also be used in reference to a reactive diluent, and thus means the weight in grams of at least one reactive diluent, or a mixture of reactive diluents, that contains 1 gram equivalent of (meth)acrylate functional groups. Thus the acrylate equivalent weight is the molecular weight of the reactive diluent divided by the number of (meth)acrylate functional groups on the reactive diluent. The term acrylate equivalent weight takes into account the effect of multifunctional reactive diluents if present. For curable compositions containing more than one multifunctional urethane, and optionally, one or more reactive diluents, the acrylated equivalent weight (AEW) of the radiation-curable composition is the weighted average EW of each of the multifunctional urethanes, and if present, the one or more reactive diluents, based on the total of the multifunctional urethanes and reactive diluents present. The acrylate equivalent weight is an indicator of the crosslinking density of the curable composition.

The term "solvent" refers to a nonreactive component of a composition that reduces the viscosity of the composition and has a volatility such that it is removed under the conditions (such as temperature) at which the composition is processed. A "solvent-free" composition is a composition that does not contain a solvent or substantially does not contain a solvent (i.e., contains zero or only trace amounts of a solvent that is less than about 0.4 wt % of the composition after application to substrate), wherein the solvent is as defined above.

The term "gravure printing" means a process in which an image is created by engraving or etching one or more depressions in the surface of a printing form, the engraved or etched area is filled with ink, then the printing form transfers the ink image to a substrate, such as paper or another material. An individual engraved or etched depression is referred to as a "cell."

The term "cell wall" refers to a ridge that separates one gravure cell from an adjacent gravure cell. And so, the term "cell wall thickness" is a width of the ridge from an edge of one cell to an edge of an adjacent cell. In most instances, the cell wall thickness is determined at an uppermost surface of the engraved layer. The cell walls, along with other non-printing areas of the engraved gravure printing form, are typically referred to as a land area of the gravure printing form.

The term "letterpress printing" means a process in which an image is created by selective removal of material in-depth from a non-elastomeric layer to form raised relief elements on the surface of a printing form, wherein an uppermost surface of the raised relief elements carries ink, and the printing form transfers the ink image from the raised element to a substrate.

The term "flexotgraphic printing" means a process in which an image is created by selective removal of material in-depth from an elastomeric layer to form raised relief elements on the surface of a printing form, wherein an uppermost surface of the raised relief elements carries ink, and the printing form transfers the ink image from the raised element to a substrate. The term "printing form" means an object (e.g., in the form of a cylinder, roll, block, or plate) used to apply ink onto a surface for printing.

The term "gravure printing form" means an object (e.g., in the form of a cylinder, roll, block or plate) used to apply ink onto a surface by gravure or rotogravure printing.

The term "printing form precursor" or "printing form blank" or "gravure printing form precursor" or "gravure printing form blank" may also be used herein to mean "printing form" that has not yet been engraved.

The term "room temperature" or, equivalently "ambient temperature," has its ordinary meaning as known to those skilled in the art and can include temperatures within the range of about 10° C. (50° F.) to about 32° C. (90° F.).

The term "solvent ink" means an ink that includes an organic solvent, typically the organic solvent is volatile, in contrast to water-based inks.

The term "curing" refers to hardening of a resin or polymeric material by crosslinking of polymer chains, brought about by chemical additives, actinic radiation, for example, ultraviolet radiation, or an electron beam, and/or heat. Hardening occurs primarily by crosslinking of the polymer chains. Other interactions in the polymer material or resin, such as branching and linear chain extension, can also occur in relatively small degree compared to crosslinking of the polymer chains.

The term "curable composition", "curable coating composition", "curable polymeric coating composition", or "curable polymer-based composition" as used herein refers to the composition that is applied to a substrate and then cured into a film or layer. The curable composition contains curable polymer material or resin and can include additional components, for example, curing agents, reactive diluents, fillers, resin modifiers, and optionally other additives.

The term "initiator" is a compound or combination of compounds that promotes polymerization reaction and decomposes into radicals when exposed to radiation or heat.

The term "radiation", "irradiation" or "actinic radiation" means radiation that causes, typically in the presence of a photoinitiator, polymerization of monomers and/or oligomers that have ethylenically unsaturated double bonds, such as acrylic or methacrylic double bonds. Actinic radiation can include ultraviolet radiation, visible light, and e-beam radiation. Sources of actinic radiation may be natural sunlight or artificial radiation sources. Examples of ultraviolet radiation as actinic radiation include, but is not limited to, UV-A radiation, which falls within the wavelength range of from 320 nanometers (nm) to 400 nm; UV-B radiation, which is radiation having a wavelength falling in the range of from 280 nm to 320 nm; UV-C radiation, which is radiation having a wavelength falling in the range of from 100 nm to 280 nm; and UV-V radiation, which is radiation having a wavelength falling in the range of from 400 nm to 800 nm.

The term "photoinitiator" is a compound that promotes polymerization reaction and decomposes into radicals when exposed to radiation. Photoinitiator encompasses one or more compounds, which individually or together, promote polymerization reaction.

The term "sensitizer" is a compound or compounds that absorb radiation to initiate a photoreaction in another compound, such as a photoinitiator, and is not consumed by the reaction. A photoinitiator system includes at least a sensitizer and at least a photoinitiator. In general, a photoinitiator system may be employed if the photoinitiator does not absorb strongly or sufficiently to the wavelength or range of wavelengths of irradiation.

The term "thermal initiator" is a compound that promotes polymerization and decomposes into radicals when heated, or exposed to heat.

The term "nanoparticle" means a particle having at least one dimension less than about 1000 nm (1 micron).

The term "microparticle" means a particle having at least one dimension equal to or greater than about 1000 nm (1 micron).

Unless otherwise indicated, the weight percent of a particular component of the curable composition is based on the percentage of the total of solid components of the composition, i.e., weight percent of solid components, which excludes solvent/s and any other migratory ingredients in the composition that would not be present in a cured layer of the composition. The curable composition can include one or more solvents and/or other ingredients that aid in one or more steps of the process to form a layer of the composition on the support, but the solvent/s and any other migratory ingredients in the composition are not present (or essentially not present, i.e., contains only trace amounts) after the composition layer is cured (and may/may not be present after a layer of the composition is formed (and dried)). As such, the solvent/s and other migratory ingredients are not included in the total weight of the components of the curable composition. The weight percent of a component based on weight percent of total of solid components may also be expressed herein as the weight percent of a component based upon the total weight of the components in the curable composition (which excludes solvents and migratory components); or, as the weight percent of a component based upon the polymerizable coated layer.

The present invention is a process for preparing a printing form from a curable composition, and particularly a process for preparing a gravure printing form from a polymer-based curable composition. The curable composition includes at least one multifunctional urethane and an initiator, and optionally one or more reactive diluents. The curable composition is characterized by a reactive group equivalent weight between about 250 and about 450 of the multifunctional urethane and the optional reactive diluent/s. In most embodiments, the curable composition is characterized by an acrylate equivalent weight between about 250 and about 450 of the multifunctional urethane and the optional reactive diluent/s.

In most embodiments, the printing form resulting from a cured layer of the curable composition is suitable for use in gravure printing applications. Gravure printing is a method of printing in which the printing form prints from an image area, where the image area is depressed and consists of small recessed cells or wells to contain the ink or printing material, and the non-image area is the surface of the form. It is contemplated that in some embodiments the printing form resulting from a cured layer of the curable composition can also have end-use printing applications in relief printing, specifically letterpress printing. Letterpress printing is a method of relief printing in which the printing form prints from an image area, where the image area of the printing form is raised and the non-image area is depressed. In general, the relief printing form for letterpress printing differs from the relief printing form for flexographic printing in that the letterpress printing form is non-elastomeric and the flexographic printing form is elastomeric.

The present process facilitates the preparation of a printing form in considerably less time, at reduced cost, and in a more environmentally-sound manner than conventional printing forms having one or more metal layers for gravure printing. Surprisingly and unexpectedly, the claimed process prepares a polymer-based gravure printing form from the particular curable composition that is capable of meeting several of the property requirements for successful performance comparable to conventional metal gravure printing forms. The particular curable composition has good coatability as the composition can be applied easily to form a layer on a supporting substrate that is relatively uniform and needs only minimal grinding or polishing. The particular curable composition has good curability as the composition can be cured rapidly by exposure to radiation. Good coatability and curability provides a high quality coating layer of the composition that can be produced within strict tolerances needed for gravure engraving and printing with minimal after treatments. Additionally, since the high quality coating and curing can be rapidly accomplished, the claimed process is economical for time and cost such that it can compete with conventional metal-plating processes for gravure printing cylinders. In most embodiments, the form is free of copper and chrome layers. In most embodiments, a cured layer of the curable composition of the acrylated polyurethane and initiator, and optional reactive diluents, is not elastomeric, that is, the cured layer is not able to resume its original shape when a deforming force is removed. In some embodiments, a cured layer of the curable composition of the multifunctional urethane and initiator, and optional reactive diluents, is a thermoset polymeric layer that does not melt when heated. In some embodiments, the cured layer of the curable composition is electrically non-conductive.

After the layer of the particular curable composition is cured, the cured layer provides the desired balance between engravability and resistance to solvents used in printing inks and cleaning solutions, such that high quality printing can be accomplished for print runs of 100,000 or more. The cured layer of the present composition can be suitably engraved to form cells that have cell wall thickness at the desired cell density and yet be sufficiently resistant to solvents so that swell is minimized. When the cured layer is not adequately solvent resistant, absorbing solvent from the solvent ink can cause the cured layer to swell excessively. Swelling excessively is detrimental to print quality and to the durability of the image carrier. In some other embodiments after the layer of the particular curable composition is cured, the cured layer provides the desired balance between engravability and resistance to solvents, as well as mechanical wear resistance and scratch resistance, such that high quality printing can be maintained for longer print runs of 300,000 impressions or more. The cured layer exhibits a level of hardness that produces well-defined print cell structures when engraved, yet resists wear and scratching during printing from contact with the doctor blade and the printed substrate, and abrasive particles that may be in the ink. In some embodiments of a printing form, the cured polymeric layer according to the present invention has a hardness that is greater than about 40 megaPascals. In some other embodiments, the cured polymeric layer has a hardness is greater than or equal to about 30 megaPascals. In other embodiments, the cured polymeric layer has a hardness that is greater than or equal to about 65 megaPascals. In yet other embodiments, the cured polymeric layer has a hardness of about 30 to about 200 megaPascals.

In some embodiments, the cured layer of the curable composition that has a reactive group equivalent weight within the desired range can be engraved to a suitable cell density with desired minimum wall thickness and can be resistant to swelling by a solvent. In most embodiments, the cured layer of the curable composition that has an acrylate equivalent weight within the desired range can be engraved to have cell density at resolution at least up to 200 lines per inch (78.7 lines per cm), with obtainable minimum wall thickness between adjacent cells typically less than or equal to about 25 µm, is resistant to swelling by even a very aggressive solvent to have less than about 15 wt % increase in weight gained, is capable of printing for print runs over 100,000 impressions and preferably more.

In some embodiments, the cured layer can be easily removed, in its entirety or in part, from the supporting printing structure, e.g., the base support or the gravure print cylinder, after a print run, so that the printing cylinder can be reused and a new curable composition can be deposited thereon to allow a new image to be engraved therein.

The curable composition includes at least one multifunctional urethane and an initiator, and optionally one or more reactive diluents. The multifunctional urethane suitable for use in the present invention is a multifunctional material having 2 or more reactive groups i.e., polymerizable groups. The multifunctional urethane may have 2, 3, 4 or more polymerizable groups. The multifunctional urethane is a urethane monomer or urethane oligomer containing two or more 2 or more ethylenically unsaturated groups per molecule as the reactive group of polymerizable functionalities. The curable composition can include one or more multifunctional urethanes. As used herein, the term "urethane component" or "multifunctional urethane" refers to all multifunctional urethanes present. In most embodiments, the multifunctional urethane is not elastomeric, and a layer of the curable composition of the multifunctional urethane is not elastomeric upon curing. In most embodiments, the multifunctional urethane composition is not a thermoplastic, and forms a thermoset polymeric layer that does not melt when heated.

In most embodiments, the multifunctional urethane contains as the reactive or polymerizable groups, 2 or more (meth)acrylate functionalities per molecule, and thus can be referred to as a multifunctional acrylated urethane. The multifunctional acrylated urethane may have 2, 3, 4 or more polymerizable groups. The multifunctional acrylated urethane is a urethane monomer or urethane oligomer containing multiple (meth)acrylate functionalities. The curable composition can include one or more multifunctional acrylated urethanes. As used herein, the term "acrylated urethane" or "multifunctional acrylated urethane" refers to all acrylated urethanes present. In most embodiments, the multifunctional acrylated urethane is not elastomeric, and a layer of the curable composition of the multifunctional acrylated urethane is not elastomeric upon curing. In most embodiments, the multifunctional acrylated urethane composition is not a thermoplastic, and forms upon curing a thermoset polymeric layer that does not melt when heated.

In one embodiment, the multifunctional acrylated urethane can be a chemical reaction product of (meth)acrylic acids, polyols and polyfunctional isocyanates. Urethane acrylates are prepared from alcohols containing (meth)acryloyl groups, and di- or poly-isocyanates. Preparation processes for acrylated urethanes are known in principle and are described, for example, in patents British Patent No. 1,159,551; U.S. Pat. No. 3,782,961; or U.S. Pat. No. 4,225,695. In other embodiments, the multifunctional acrylated urethane can be preformed, that is the uncrosslinked acrylated urethane monomer or oligomer has the urethane linkages already formed, (i.e., the acrylated urethane does not contain reaction components (i.e., (meth)acrylic acids, polyols, and polyfunctional isocyanates) that form a urethane) but does include the multiple (meth)acrylate functional groups.

Alcohols containing (meth)acryloyl groups are to be understood as being both esters, containing a free hydroxyl group, of acrylic acid or methacrylic acid with dihydric alcohols, such as, for example, 2-hydroxyethyl, 2- or 3-hydroxypropyl, or 2-, 3-, 4-hydroxybutyl (meth)acrylate, and any desired mixtures of such compounds. In addition, monohydric alcohols containing (meth)acryloyl groups, or reaction products consisting substantially of such alcohols, which are obtained by esterification of n-hydric alcohols with (meth)acrylic acid and optionally further dicarboxylic acids, can also be used. It is possible to use as alcohols also mixtures of different alcohols, so that n represents an integer or a fractional number in the statistical mean of from greater than 2 to 4, preferably 3, and wherein n−1 mole of (meth)acrylic acid is particularly preferably used per mole of the mentioned alcohols. It is also possible to use reaction products of such monohydric alcohols containing (meth)acryloyl groups with epsilon-caprolactone. Preference is given to the reaction products of hydroxyalkyl (meth)acrylates with epsilon-caprolactone.

Suitable di- or poly-isocyanates can be (cyclo)aliphatic, araliphatic and aromatic compounds. Examples of (cyclo)aliphatic compounds include, but are not limited to, hexamethylene diisocyanate or isophorone diisocyanate, trimethylhexamethylene diisocyanate, di(isocyanatocyclohexyl)methane or derivatives thereof having a urethane, isocyanurate, allophanate, biuret, uretdione structure, and mixtures thereof.

Because of the many different structural forms of the available polyfunctional isocyanates and polyols, customized products having adjustable product properties are obtainable. For example, increased acrylate contents and accordingly high crosslinking densities can be established by way of higher functional polyols. By choosing suitable polyfunctional (generally di- or tri-functional) isocyanates, properties such as light resistance or flexibility, for example, can be influenced. Such acrylated urethanes are usually soluble in organic solvents, such as alcohols or esters. However, by using very hydrophilic polyol components, for example ethoxylated units, it is also possible to prepare products that are dispersible in water.

The multifunctional urethane can be a urethane homopolymer or a co-polymer of a urethane oligomer and one or more of other polymers including, but not limited to, polyesters, epoxies, and polyethers. In addition to the urethane linkages and the two or more polymerizable functionalities, the multifunctional urethane can include other polymeric linkages, such as, for example, polyester linkages, polyether linkages, and epoxy linkages, provided that the urethane linkages are in greater proportion of the other polymeric linkages, and thus is still considered a multifunctional urethane. The urethane linkages of the multifunctional urethane oligomer can form the backbone and side chains of the oligomer. In other embodiments, the multifunctional urethane oligomer includes urethane linkages that form side chains of the oligomer, and other polymeric linkages (i.e., non-urethane) form the backbone of the oligomer. In yet other embodiments, the multifunctional urethane oligomer includes urethane linkages that form the backbone of the oligomer, and other polymeric linkages (i.e., non-urethane) form the side chains of the oligomer. The reactive group equivalent weight of the multifunctional urethane oligomer is then the molecular weight of the homopolymer or copolymer divided by the number of polymerizable functional groups, i.e., ethylenically unsaturated groups, on the urethane and the other polymer/s. Regardless of the location of the urethane linkages (i.e., on the backbone and/or the side chains) the multifunctional urethane oligomer includes at least 50% urethane linkages, and 50% or less of the other polymeric (i.e., non-urethane) linkages, based on the multifunctional urethane oligomer.

The acrylated urethane can be a urethane homo-polymer or a co-polymer of a urethane oligomer and one or more of other polymers including, but not limited to, polyesters, epoxies, and polyethers. In some embodiments, the acrylated urethane is a copolymer of a monomer or oligomer containing urethane linkages and a monomer or oligomer containing polyester linkages, having at least two or more (meth)acrylate functionalities. In one embodiment, the acrylated urethane is a copolymer of one or more urethane acrylates and one or more polyester acrylates. In some embodiments, the acrylated urethane is a copolymer of a monomer or oligomer containing urethane linkages and a monomer or oligomer containing epoxy linkages, having at least two or more (meth)acrylate functionalities. In one embodiment, the acrylated urethane is a copolymer of one or more urethane acrylates and one or more epoxy acrylates. In some other embodiments, the acrylated urethane is a copolymer of a monomer or oligomer containing urethane linkages and a monomer or oligomer containing ether linkages, having at least two or more (meth)acrylate functionalities. In one embodiment, the acrylated urethane is a copolymer of one or more urethane acrylates and one or more ether acrylates. In most embodiments of the acrylated urethane as a copolymer, the urethane component includes the at least two or more (meth)acrylate functionalities. In some other embodiments of the acrylated urethane as a copolymer, the urethane component includes the at least two or more (meth)acrylate functionalities and the other polymer component also includes (meth)acrylate functionalities. Such that, in addition to the urethane linkages and the two or more (meth)acrylate functionalities, the acrylated urethane can include other polymeric linkages, such as, for example, polyester linkages, polyether linkages, and epoxy linkages, provided that the urethane linkages are in greater proportion of the other polymeric linkages, and thus is still considered an acrylated urethane.

In some embodiments, the urethane linkages of the acrylated urethane oligomer form the backbone and side chains of the oligomer. In some other embodiments, the acrylated urethane oligomer includes urethane linkages that form side chains of the oligomer, and other polymeric linkages (i.e., non-urethane) form the backbone of the oligomer. In yet other embodiments, the acrylate urethane oligomer includes urethane linkages that form the backbone of the oligomer, and other polymeric linkages (i.e., non-urethane) that form side chains of the oligomer. The acrylate equivalent weight of the urethane oligomer is then the molecular weight of the homopolymer or copolymer divided by the number of (meth)acrylate functional groups on the urethane and the other polymer/s.

In one embodiment, regardless of the location of the urethane linkages (i.e., on the backbone and/or the side chains) the acrylated urethane oligomer includes at least 50% urethane linkages, and 50% or less of the other polymeric (i.e., non-urethane) linkages, based on the acrylated urethane oligomer. In other embodiments, the acrylated urethane oligomer includes at least 60% urethane linkages, and 40% or less of the other polymeric linkages (i.e., non-urethane) linkages. In yet other embodiments, the acrylated urethane oligomer includes at least 80% urethane linkages, and 20% or less of the other polymeric linkages (i.e., non-urethane) linkages. Depending on the choice of individual structural units, suitable acrylated urethanes can have different molecular weights, which are in one embodiment in the range from 200 to 3000 g/mol, in another embodiment in the range from 300 to 1000 g/mol, and in yet another embodiment in the range from 250 to 5000 g/mol. The molecular weight of the acrylated urethane is not limited to about 200 to about 5000 g/mol, and can be greater than about 5000 g/mol provided that the acrylate urethane falls within the range of the acrylate equivalent weight. Commercially available urethane acrylate systems are supplied solvent-free or in combination with reactive diluents.

Acrylated urethanes suitable for use in the present invention are available commercially, and may be sold by for example, Bayer Material Science AG (Leverkusen, Germany) under the trademark Desmolux®, Cytec Industries Inc. (Woodland Park, N.J., USA) under the trademark Ebecryl®, Allnex (Smyrna, Ga., USA) under the Ebecryl® and Desmolux® trademarks, BASF Polyurethanes North America ((Wyandotte, Mich., USA)) under the trademark Elastollan, and by Estron Chemical ((Calvert City, Ky., USA)) under the Isocryl label.

The curable composition includes at least one multifunctional urethane having reactive groups, and optionally one or more reactive diluents having reactive groups, and an initiator, wherein the composition has an reactive group equivalent weight between about 250 and about 450. In another embodiment, the curable composition includes two or more multifunctional urethanes, and optionally one or more reactive diluents, wherein the composition has a reactive group equivalent weight between about 250 and about 450. The curable composition having two or more multifunctional urethanes (and optionally reactive diluent/s) that are a blend or a mixture facilitates achieving the desired balance of solvent resistance and engraveablily.

In one embodiment, the curable composition includes one multifunctional acrylated urethane, and optionally one or more reactive diluents, and an initiator, wherein the composition has an acrylate equivalent weight between about 250 and about 450. In another embodiment, the curable composition includes two or more multifunctional acrylated urethanes, and optionally one or more reactive diluents, wherein the composition has an acrylate equivalent weight between about 250 and about 450.

In some other embodiments, the curable composition includes two or more multifunctional acrylated urethanes that are a blend of at least one soft multifunctional acrylated urethane and at least one hard multifunctional acrylated urethane, which have an acrylate equivalent weight between about 250 and about 450 (of the blend of acrylated urethanes and the optional reactive diluent), to facilitate achieving the desired balance of solvent resistance and engraveablily. A "soft" or flexible multifunctional acrylated urethane is a urethane oligomer having the two or more acrylate groups wherein the structure of the oligomer and/or the presence of long flexible chains, e.g., of about 4 to about 15 carbon atoms, of the oligomer separates the acrylate groups on the molecule. In some embodiments, a soft multifuncitional acrylated urethane has two acrylate groups. A "hard" multifunctional acrylated urethane is a urethane oligomer having the two or more acrylate groups but the acrylate groups on the molecule are closely positioned to one another on the molecule and/or the chains separating the acrylate groups are rigid, i.e., characterized by cyclic or polycyclic groups. In another embodiment, the multifunctional acrylated urethane is a blend of at least one soft multifunctional acrylated urethane and at least one hard multifunctional acrylated urethane, wherein the acrylate equivalent weight is based upon a weighted average of the functionality of each of the at least one soft acrylated urethane and at least one hard acrylated urethane, and which is between about 250 and about 450 (of the blend of acrylated urethanes and the optional reactive diluent). Curable compositions that are a blend of at least one soft multifunctional acrylated urethane and at least one hard multifunctional acrylated urethane are disclosed in US 2014/0037874 A1. A blend of soft acrylated urethane to hard acrylated urethane can be in a ratio range of between any of the two following values: 10 to 90; 15 to 85; 20 to 80; 25 to 75; 30 to 70; 35 to 65; 40 to 60; 45 to 55; 50 to 50; 55 to 45; 60 to 40; 65 to 35; 70 to 30; 75 to 25; 80 to 20; 85 to 15; 90 to 10.

In another embodiment, the curable composition includes two or more multifunctional acrylated urethanes (and optionally reactive diluent/s) that are a blend or a mixture to facilitate achieving the desired balance of solvent resistance and engraveablily. The combination of the two or more multifunctional acrylated urethanes need not be selected based upon whether or not the multifunctional acrylated urethanes are soft or hard as described above. Other factors that can influence selection of multifunctional acrylated urethanes for use in the present invention can include scratch resistance, wear resistance, and toughness. The proportion of each of the two or more multifunctional acrylated urethanes in the curable composition is not limited.

The multifunctional urethane employed in the present invention are polymerizable compounds which cure rapidly into a network due to multiple functionalities (more than one polymerizable group) available on each urethane monomer or oligomer. If there is only one reactive group, a linear non-networked molecule will result upon cure of the material which is undesireable. Multifunctional urethanes having a functionality of two or more, preferably greater than two, are suitable in this invention to promote desired polymeric network formation. In order to provide the desired balance of properties of engraveablity and solvent resistance, the curable composition that includes at least one multifunctional urethane, and optionally one or more reactive diluents has a reactive group equivalent weight (RGEW) in the range of between about 250 and about 450. If more than one multifunctional urethane, and optionally one or more reactive diluents, is present in the curable composition, the reactive group equivalent weight of the composition is a weighted average of the reactive group equivalent weight of each of the urethane components and the reactive diluents if present. If the curable composition includes one or more multifunctional urethanes, and one or more reactive diluents, the reactive group equivalent weight (RGEW) of the composition is a weighted average of the reactive group equivalent weight of each of the urethane components and the reactive diluents, and is in the range of between about 250 and about 450. A layer of a cured composition that has a reactive group equivalent weight, and in particular an acrylate equivalent weight, of lower than about 250 generally exhibits poor engravability. A layer of a cured composition that has a reactive group equivalent weight, and in particular an acrylate equivalent weight, greater than about 450 results in poor solvent uptake by the cured layer, i.e., the cured layer absorbs too much of one or more solvents and swells. The one or more multifunctional urethane is present in the curable composition in an amount of 30% by weight or more, relative to the total weight of the components of the curable composition, i.e., weight percent solids, which has been found to provide excellent engraving and printing properties.

The multifunctional acrylated urethane employed in the present invention are polymerizable compounds which cure rapidly into a network due to multiple functionalities (more than one (meth)acrylate group) available on each urethane monomer or oligomer. If there is only one (meth)acrylate functionality, a linear, non-networked molecule will result upon cure of the material, which is undesirable. Multifunctional acrylated urethanes having a functionality of two or more, preferably greater than two, are suitable in this invention to promote desired polymeric network formation. In order to provide the desired balance of properties of engraveablity and solvent resistance, the curable composition that includes at least one multifunctional acrylated urethane, and optionally one or more reactive diluents has an acrylate equivalent weight (EW) in the range of between about 250 and about 450. If more than one multifunctional acrylated urethane, and optionally one or more reactive diluents, is present in the curable composition, the acrylate equivalent weight of the composition is a weighted average of the acrylate equivalent weight of each of the urethane components and the reactive diluents if present. If the curable composition includes one or more multifunctional acrylated urethanes, and one or more reactive diluents, the acrylate equivalent weight (EW) of the composition is a weighted average of the acrylate equivalent weight of each of the urethane components and the reactive diluents, and is in the range of between about 250 and about 450.

A layer of a cured composition that has an acrylate equivalent weight of lower than about 250 generally exhibits poor engravability. In the present invention, a composition having acrylate EW less than about 250 will form a cured layer that will have a relatively high crosslinking density such that the engraveability of the cured layer will be detrimentally influenced, particularly by engraving with electro-mechanical engravers. A cured layer that is highly crosslinked may be brittle, easily fragment or chip, and/or not be able to create and hold fine or thin walls between adjacent cells. A highly crosslinked layer may also exhibit poor adhesion to a cylinder surface. For quality gravure printing, the engraved cells in the print form should be formed close together, e.g., at 170 to 200 lines per inch in some embodiments and at 150 to 230 lines per inch in other embodiments, and have cell depth of about 10 to about 80 micrometers, and more typically 10 to 50 micrometers. In some cases, the cured composition layer exhibits poor engravability if on average the cell walls, i.e., the width of the land area or ridge created between adjacent gravure cells, that are formed at the desired cell density and depth, are chipped, broken, or not uniformly formed. In some other cases, the cured composition layer exhibits poor engravability if the cell density and/or depth of the engraved cells are adjusted such that the width of the land area between adjacent cells is increased and the cell walls are not chipped, broken and are uniform. In most embodiments, the cured composition has acceptable engravability if the cells engraved in the cured layer have an average cell wall thickness of 25 micron or less.

A layer of a cured composition that has an acrylate equivalent weight greater than about 450 results in poor solvent uptake by the cured layer, i.e., the cured layer absorbs too much of one or more solvents and swells. In the present invention, a composition having an acrylate EW greater than about 450 will form a cured layer that has a relatively low degree of crosslinking such that the resistance of the layer to absorption by one or more solvents is low, i.e., the layer excessively swells in contact with solvent/s. Inks used for gravure printing typically include a solvent, and in some cases the solvent can be particularly aggressive. When the cured layer is not adequately solvent resistant, absorbing solvent from the solvent ink can cause the cured layer to swell excessively, which is detrimental to print quality and to the durability of the image carrier. In most instances, methyl ethyl ketone (MEK) is selected as a solvent for determining solvent resistance of the cured composition layer since it is solvent that is typically used in printing inks and it is a relatively aggressive solvent compared to other possible ink solvents such as, toluene; alcohols, e.g., propanols, butanols; and, acetates, e.g., ethyl acetate, propyl acetate, butyl acetate. In other instances, the solvent resistance of the cured layer may also be evaluated based on one or more ink solvents that are commonly used.

In most embodiments, a cured layer of the composition having the acrylate EW of about 250 to about 450 exhibits acceptable balance of both engravability and solvent resistance. In other embodiments, a layer of the cured composition having the acrylate EW of about 255 to about 440 exhibits acceptable balance of both engravability and solvent resistance. In some other embodiments, a layer of the cured composition having the acrylate EW of about 270 to about 430 exhibits acceptable balance of both engravability and solvent resistance. In yet other embodiments, a layer of the cured composition having the acrylate EW of about 300 to about 400 exhibits acceptable balance of both engravability and solvent resistance. In still other embodiments, a layer of the cured composition having the acrylate EW of about 250 to about 350 exhibits acceptable balance of both engravability and solvent resistance.

A layer of the cured composition having the acrylate EW of about 250 to about 450 exhibits acceptable balance of engravability and solvent resistance since the engraved cells having average cell wall thickness of about 25 microns or less, and the layer has an increase in weight of 15% or less upon soaking in a solvent for several days, typically seven days, can both be achieved. In some embodiments, a layer of the cured composition having the acrylate EW of about 250 to about 450 exhibits acceptable balance of engravability and solvent resistance since the engraved cells having average cell wall thickness of about 25 microns or less, and the layer has an increase in weight of 12% or less upon soaking in a solvent for seven days can both be achieved. In some embodiments, a layer of the cured composition having the acrylate EW of about 250 to about 450 exhibits acceptable balance of engravability and solvent resistance since the engraved cells having average cell wall thickness of 22 microns or less, and the layer has an increase in weight of 11% or less upon soaking in a solvent for seven days can both be achieved. In some embodiments, a layer of the cured composition having the acrylate EW of about 250 to about 450 exhibits acceptable balance of engravability and solvent resistance since the engraved cells having average cell wall thickness of 15 to 19 microns, and the layer has an increase in weight of 8% or less upon soaking in a solvent for seven days can both be achieved. In yet other embodiments, a layer of the cured composition having the acrylate EW of about 250 to about 450 acceptable balance of engravability and solvent resistance since the engraved cells having average cell wall thickness of 25 to 27 microns or less, and the layer has an increase in weight of 3% or less upon soaking in a solvent for seven days can both be achieved.

The one or more multifunctional acrylated urethane is present in the curable composition in an amount of 30% by weight or more, relative to the total weight of the components of the curable composition, i.e., weight percent solids, which has been found to provide excellent engraving and printing properties. The multifunctional acrylated urethane can be in an amount between and optionally including any two of the following values: 30, 35, 40, 45, 50, 55, 60, 65, 70, 75, 80, 85, 90, 95, 98, and 99 parts by weight based on the total weight of the solid components in the curable composition, (excluding solvent/s and migratory material/s, if present). In some embodiments, the multifunctional acrylated urethane is present at least 30 wt % of the total weight of the solid components in the curable composition. The multifunctional acrylated urethane component is present in an amount between about 35 and 95 wt % in one embodiment; in an amount between about 40 and 95 wt % in another embodiment; and, in an amount between about 45 and 80 wt %, based on the total weight of solid components in the curable composition.

The curable composition includes an initiator that can be activated by actinic radiation, i.e., a photoinitiator; or, that can be activated by heat, i.e., thermal initiator.

The curable composition includes one or more photoinitiators and/or sensitizers that initiate polymerization upon exposure to actinic radiation, in an amount sufficient to obtain the desired cure response. The photoinitiator can be any single compound, or a combination of compounds, which is sensitive to actinic radiation, generating free radicals which initiate the reaction of the acrylate groups without excessive termination. The photoinitiator can be a mixture of compounds, one of which provides the free radicals when caused to do so by a spectral sensitizing agent or sensitizer activated by radiation. In general, spectral sensitizing agents are those materials that absorb radiation at a wavelength different than that of the reaction-initiating component, i.e., photoinitiator, and are capable of transferring the absorbed energy to the photoinitiator, such that, the wavelength of the activating radiation can be adjusted.

In some embodiments, the curable composition includes one photoinitiator that reacts to one or more wavelengths in a range of wavelengths that is emitted by the source of actinic radiation for exposing the layer of the composition. In some other embodiments, the curable composition includes two photoinitiators. In this embodiment, one photoinitiator cures a layer of the curable composition in-depth (i.e., through the thickness of the layer), and another photoinitiator cures an exterior surface of the layer. In most embodiments of the curable composition having two photoinitiators, both of the photoinitiators still react to one or more wavelengths in a range of wavelengths that is emitted by the source of actinic radiation for exposing the composition layer. In other embodiments of the curable composition having two photoiniators, each photoinitiator can react to one or more wavelengths in different ranges of wavlengths that is emitted by different sources of actinic radiation.

In one embodiment, the initiator includes one or more photoinitiators that are present in an amount from about 0.1 wt % to about 15 wt % based on the total weight of the solid components in the curable composition. The one or more photoinitiators can be between and optionally include any two of the following values: 0.1, 0.2, 0.3, 0.4, 0.5, 1, 3, 5, 7, 9, 11, 13, and 15 wt %, based on weight percent solids. In another embodiment, the one or more photoinitiators are present in an amount from about 1 to about 5 wt % based on the total weight of the solid components in the curable composition. In most embodiments, the photoinitiator is sensitive to visible or ultraviolet radiation.

As known to those skilled in the art, many photoinitiators can be suitable for the invention described herein. These include, but are not limited to, quinones; phenanthraquinones; polynuclear quinones; benzophenones; benzoin ethers, such as for example, benzoinmethyl ethers, benzoin-n-butyl ethers, benzoin-iso-butyl ethers; ketones, such as, for example, aryl ketones, oxysulfonyl ketones, sufonyl ketones, amino ketones; propiophenones; acetophenones, such as hydroxy alkyl phenyl acetophone, dialkoxy acetophenone, and 2,2-diethoxyacetophenones; alpha halogen acetopheones; 1-hydroxycyclohexyl phenyl ketones; thiophenylmorpholino ketones; thioxanthones; methylphenylgloxylates; ethylphenylpyloxylates; acylphosphine oxides; alkoxyphenyl-substituted phosphine oxides, such as, for example, bis(2,4,6, trimethyl benzoyl)-phenyl phosphine oxide, diphenyl (2,4,6-trimethylbenzoyl)-phosphine oxide; peroxides; biimidazoles; benzoyl oxime esters; borates; and, Michler's ketones.

In one embodiment, two photoinitiators are included in the curable composition, in which an alkoxyphenyl-phosphine oxide is a photoinitiator that cures a layer of the curable composition in-depth, and a ketone is another photoinitiator that cures an exterior surface of the layer. Combinations of the commercial photoinitiator products are also suitable. Commercial photoinitiator products, such as Darocure® 1173, Darocure® MBF, Darocure® TPO or Irgacure® 184, Irgacure® 4265, Irgacure® 819, Irgacure® 2022, or Irgacure® 2100, all of which are currently available from BASF SE, (Wyandotte, Mich., USA.), are also suitable. Darocure® and Irgacure® are registered trademarks of BASF SE. In another embodiment, the photoinitiator can be a pre-prepared mixture (or blend) of two or more photoinitiating compounds, such as the photoinitiating products commerically available from PL Industries (Essington, Pa., USA), a division of ESSTECH, Inc., which include PL-600, PL-610, PL-620, PL-625, PL-630, PL-450, PL-460, PL-TPO, PL-TPO-L, PL-ITX, PL-907, PL-100, PL-150, and PL-369.

Thermal initiators are radical thermal polymerization initiators that in the presence of heat initiate and progress curing reaction of the addition polymerizable compound/s, such as the multifunctional urethane and optional resin modifiers. Thermal initiators include, but are not limited to, aromatic ketones; onium salt compounds; organic peroxide compounds; thio compounds; hexaarylbiimidazole compounds; ketoxime ester compounds; borate compounds; azinium compounds; azide compounds; quinone diaazide compounds; metallocene compounds; active ester compounds; a compound having a carbon halogen bond; borates; and, azo-based compounds. In some embodiments, the curable composition may include one, or two or more thermal initiators to facilitate polymerization.

In one embodiment, the initiator includes one or more thermal initiators that are present in an amount from about 0.1 wt % to about 15 wt % based on the total weight of the solid components in the curable composition. The one or more thermal initiators can be between and optionally include any two of the following values: 0.1, 0.5, 1, 3, 5, 7, 9, 11, 13, and 15 wt %, based on weight percent solids. In another embodiment, the one or more thermal initiators are present in an amount from about 1 to about 5 wt % based on the total weight of the solid components in the curable composition.

The curable composition of the present invention optionally includes one or more resin modifiers to provide desired properties for the polymer-based composition to form a layer, and/or a cured layer suitable for printing. Resin modifiers can be used to increase crosslinking density and/or stabilize the crosslinked network, which can provide improved end-use characteristics, such as increased solvent resistance, wear resistance, and/or improve engravability of the cured layer of the composition. The optional resin modifiers can be added to address one, or more than one property of the curable composition and/or the cured layer of the composition. Some resin modifiers, such as reactive diluents, include two or more polymerizable groups which influences the reactive group equivalent weight, or the acrylate equivalent weight, of the curable composition. Some other resin modifiers, such as monomers that have only one polymerizable group, in most embodiments do not influence the reactive group equivalent weight, or the acrylate equivalent weight, of the curable composition.

As one kind of resin modifier, the curable composition optionally includes one or more reactive diluents (referred to herein as "the diluent component") generally to facilitate the coatablility of the composition. A reactive diluent can be used to achieve desired viscosity of the curable composition while maintaining desired properties of the cured composition. The reactive diluents can be incorporated in the urethane component or can be separately added to the composition. A reactive diluent is a diluent which has two or more polymerizable groups, i.e., ethylenically unsaturated groups, and itself becomes part of the final cured composition. If the curable composition includes one or more reactive diluents with the multifunctional urethane, the reactive group equivalent weight of the composition is a weighted average of the reactive group equivalent weight of the urethane component and the reactive group equivalent weight of the one or more reactive diluents.

In most embodiments, the reactive diluent is a diluent which has two or more (meth)acrylate groups, and itself becomes part of the final cured composition. Suitable reactive diluents for use in the process described herein are low molecular weight difunctional (meth)acrylate monomers and/or oligomers, and trifunctional (meth)acrylate monomers and/or oligomers. In general, reactive diluents have a molecular weight of less than 5000, and particularly less than about 500. The viscosity of the reactive diluents is typically less than about 300 cp at room temperature. The specific diluent chosen can significantly affect cured coating properties such as engravability and solvent uptake, depending on the diluent's chemical structure and how rapidly and to what degree crosslink density is increased. If the curable composition includes one or more reactive diluents with the multifunctional acrylated urethane, the acrylate equivalent weight of the composition is a weighted average of the acrylate equivalent weight of the urethane component and the acrylate reactive group equivalent weight of the one or more reactive diluents.

Compounds suitable for use as the reactive diluent are not limited, provided that the diluent has two or more polymerizable groups, and has a viscosity at room temperature that can facilitate coating of the curable composition. The viscosity of the reactive diluent is less than about 300 cp at room temperature in most embodiments, but can be greater, that is, about 300 to about 1100 cp at room temperature in some other embodiments. In general, ethylenically unsaturated compounds, i.e., monomers, having two or more ethylenic unsaturation groups can be a reactive diluent. In some embodiments monomers having two or more (meth)acrylate groups can be a reactive diluent. Non-limiting examples of reactive diluents include: vinyl ethers, such as for example, diethyleneglycol divinyl ether; n-tricyclodecane dimethanol diacrylate (TCDDA); hexamethylene diol diacrylate (HDDA); butanediol diacrylate (BDDA); dipropylene glycol diacrylate (DPGDA); trimethylol propane triacrylate (TMPT); ethoxylated trimethylol propane triacrylate (et-TMPT); and trimethylpropane trimethacrylate (TMPTMA). Tricyclodecanedimethanol diacrylate (TCDDA), shown below, is one example of a difunctional reactive diluent.

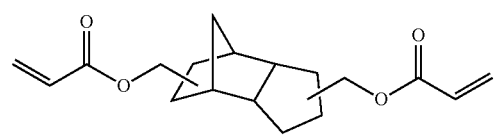

Reactive diluents that contain one or more cyclic aliphatic groups; and/or that contain one or more rigid chains; and/or that contain relatively short chains are particularly additive to the acrylated urethane toward enhancing the solvent resistance and engravability of the cured layer of the curable composition. Reactive diluents that are polycyclic are generally preferred to help the glass transition temperature, $T_g$, and minimize coating shrinkage of the cured layer of the composition. Some acrylated oligomers also come diluted with a reactive diluent such as hexamethylene diol diacrylate (HDDA) and dipropylene glycol diacrylate (DPGDA).

An example of a suitable trifunctional diluent is ethoxylated trimethylol propane triacrylate (et-TMPT) (CAS Reg. No. 28961-43-5), shown below.

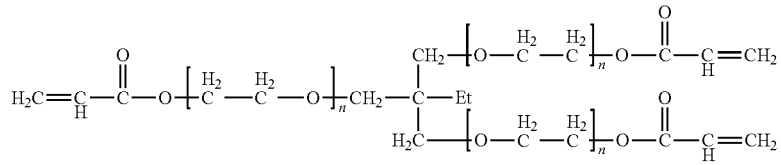

Some commercial resins include trimethylol propane triacrylate (TMPT).

In some embodiments, the diluent is used in large enough amounts that the curable composition can be applied as a solution or liquid having a viscosity in the range of about 200 to about 20000 cp at the coating temperature to form a layer on a supporting substrate; and yet in small enough amounts that the chemical resistance and other properties of the cured composition are not impaired. In one embodiment, the diluent is not present. In other embodiments, the diluent is present in the curable composition in an amount from about 0.2 to about 40 wt %, based on the total weight of the components of the curable composition. The reactive diluent can be between and optionally include any two of the following values: 0, 0.2, 0.5, 1, 2, 3, 4, 5, 7.5, 10, 12.5, 15, 17.5, 20, 22.5, 25, 27.5, 30, 32.5, 35, 37.5, and 40 wt %, based on the total weight of the solid components of the curable composition. In some embodiments, the curable composition includes one or more reactive diluents that are present in an amount greater than the one or more acrylated urethanes, on a weight percent basis of the solid components.

Another type of resin modifier is a monofunctional diluent. The monofunctional diluent is a non-crosslinking reactive diluent having a reactive group that participates in the thermal or photo-reaction to become part of the cured composition, but due to its single functional group does not contribute to the crosslinking density of the polymer. The curable composition optionally includes one or more monofunctional diluents that have one polymerizable group, i.e., ethylenically unsaturated group, that becomes part of the cured composition. In some embodiments, the monofunctional diluent has one (meth)acrylate group as the ethylenically unsaturated group and becomes part of the cured composition. The monofunctional diluent does not add to crosslinking density and as such is not included in the reactive group equivalent weight, or the acrylate equivalent weight, of the curable composition. Monofunctional diluents can be added to modify the properties of the curable composition for coating as a solution, and/or to modify the properties of the cured layer of the composition. In general, monofunctional diluents have a molecular weight of less than 5000, and particularly less than about 500. The viscosity of the monofunctional diluent is less than about 300 cp at room temperature in most embodiments, but can be greater, that is, about 300 to about 1100 cp at room temperature. The viscosity of the monofunctional diluent is typically less than about 300 cp at room temperature. Depending upon the monofunctional diluent chosen and the amount incorporated, the presence of the compound can facilitate coatability of the curable composition but can also impact the solvent resistance and/or engravability of the cured layer of the composition. In one embodiment, the monofunctional diluent is not present. In other embodiments, the monofunctional diluent is present in the curable composition in an amount from about 0.2 to about 20 wt %, based on the total weight of the components of the curable composition. The monofunctional diluent can be between and optionally include any two of the following values: 0, 0.2, 0.5, 1, 2, 3, 4, 5, 8, 10, 11, 13, 15, 18, and 20 wt %, based on the total weight of the solid components of the curable composition.

Monofunctional diluents having flexible chains, i.e., chains of 5 or more carbon atoms, can improve the flexibility of the coating composition, but also tend to increase the uptake of solvent, i.e., have lower solvent resistance. As such, the curable composition can include one or more monofunctional diluents with solvent-philic chains at less than or equal to about 5 wt % in some embodiments, and at less than or equal to about 2 wt % in some other embodiments. Examples of monofunctional diluents that are solvent-philic include, but are not limited to alkyl monoacrylates having 5 or more carbons, such as lauryl acrylates, hexyl acrylates; and polyether acrylates. Yet other monofunctional diluents do not have such a detrimental effect upon solvent resistance of the cured layer of the composition. Monofunctional diluents that contain one or more cyclic aliphatic groups; and/or that contain one or more rigid chains; and/or that contain relatively short chains can facilitate coatability of the composition, while not significantly impacting the solvent update of the cured layer of the curable composition. As such, the curable composition can include one or more monofunctional diluents that have the cyclic aliphatic group/s and/or rigid side chains at less than or equal to about 15 wt % in some embodiments, and at less than or equal to about 8 wt % in some other embodiments, and at less than or equal to about 5 wt % in yet other embodiments. Examples of suitable monofunctional diluents that have the cyclic aliphatic group/s and/or rigid side chains include without limitation: isobornyl acrylate ("IBOA") and 4-t-butylcyclohexyl acrylate (available as Laromer® TBCH from BASF Aktiengesellschaft, Ludwigshafen, Germany).

Other optional resin modifiers are monomers having one or more photopolymerizable reactive groups, i.e., ethylenically unsaturated groups, that becomes part of the final cured composition, but have viscosity that is sufficiently high such that the monomer would not suitably function as a diluent for the curable composition. The viscosity of the monomeric compounds is greater than about 300 cp at room temperature in some embodiments, but can be greater than about 1100 cp at room temperature in other embodiments. Some compounds having one or more reactive group/s and having viscosity between about 300 and about 1100 cp could be considered diluents (reactive or monofunctional) for the curable composition or could be considered monomers. Some resin modifiers, such as ethoxylated trimethylol propane triacrylate (et-TMPT) can have a range of molecular weight, and thus a range of viscosity is possible. Also, the suitability of some monomers to function as diluents (reactive or monofunctional) for the curable composition, or to provide other function/s as part of the final cured composition, can depend in part upon the viscosity of the curable composition that is desired for application to the substrate and the method by which the curable composition is applied to the substrate. Similar to the resin modifier diluents, multifunctional monomers having two or more reactive groups should be included in the weighted average of the reactive group equivalent weight of the curable composition; and, monofunctional monomers having one reactive group should not be included in the weighted average of the reactive group equivalent weight to the curable composition. However, if the multifunctional monomer is present in relatively small amounts, e.g., less than about 10 wt %, the reactive group equivalent weight of the curable composition may not be significantly influenced unless the composition is near an end of the range for the reactive group equivalent weight.

In most embodiments, the monomers are acrylated monomers that have one or more (meth)acrylate groups. To the extent that the following resin modifier compounds have viscosity greater than about 1100 cp they can be considered monomers; or have viscosity less than about 300 cp they can be considered diluents; or, have a viscosity between about 300 and about 1100 cp they can be monomers or diluents depending on their influence to the viscosity of the curable composition. The following resin modifiers are suitable for use in the curable composition, and include, but are not limited to, acrylate monoesters of alcohols and polyols; acrylate polyesters of alcohols and polyols; methacrylate monoesters of alcohols and polyols; and methacrylate polyesters of alcohols and polyols; where the alcohols and the polyols suitable include alkanols, alkylene glycols, pentaerythritol, and polyacrylol oligomers. In one embodiment, the monomer is not present. In other embodiments, the monomer is present in the curable composition in an amount from about 0.2 to about 20 wt %, based on the total weight of the components of the curable composition. The monomer can be between and optionally include any two of the following values: 0, 0.2, 0.5, 1, 2, 3, 4, 5, 6, 7, 8, 9, 10, 12, 15, 18, and 20 wt %, based on the total weight of the solid components of the curable composition.

Other resin modifiers that are optional in the curable composition are auxilliary resin modifying compounds which can be included to fine tune the resin properties such as the crosslinking density, solvent resistance, engravability, wear resistance, and reduce film shrinkage. Auxilliary resin modifying compounds are generally non-urethane compounds, and include, but are not limited to, monomers and oligomers of epoxy (meth)acrylates; monomers and oligomers of polyester (meth)acrylates; and monomers and oligomers of polyether (meth)acrylates. Also suitable are acrylate derivatives and methacrylate derivatives of isocyanates. In one embodiment, the auxilliary resin modifying compound is not present. In other embodiments, the auxilliary resin modifying compound is present in the curable composition in an amount from about 0.2 to about 35 wt %, based on the total weight of the components of the curable composition. The auxilliary resin modifying compounds can be between and optionally include any two of the following values: 0, 0.2, 0.5, 1, 2, 3, 4, 5, 6, 7, 8, 9, 10, 12, 15, 18, 20, 22, 25, 28, 30, 32, and 35 wt %, based on the total weight of the solid components of the curable composition. If the auxilliary resin modifying compounds is a monomer or oligomer that includes two or more polymerizable groups, the influence of the multifunctional auxilliary modifing on the crosslinking density is included by a weighted average of the reactive group equivalent weight, or the acrylate equivalent weight, of the curable composition. However, if the multifunctional auxilliary modifying compound is present in a relatively small amount, e.g., less than about 10 wt %, the acrylate equivalent weight (or reactive group equivalent weight) of the curable composition may not be significantly influenced unless the composition is near an end of the range for the acrylate equivalent weight. If the auxilliary resin modifying compounds are monomers or oligomers that have only one polymerizable group, their presence is not included in the acrylate equivalent weight (or reactive group equivalent weight) for the curable composition.

In some embodiments, one or more or a combination of the resin modifiers, which is selected from the reactive diluents, monofunctional diluents, monomers, and auxilliary resin modifying compounds, are present in the curable composition in a total amount from about 0.2 to about 40 wt %, based on the total weight of the components of the curable composition. The total amount of the resin modifiers can be between and optionally include any two of the following values: 0, 0.2, 0.5, 1, 2, 3, 4, 5, 6, 7, 8, 9, 10, 12, 15, 18, 20, 22, 25, 28, 30, 32, 35, 36, 37, 38, 39, and 40 wt %, based on the total weight of the solid components of the curable composition.

Small amounts of solvent, such as acetone or n-butyl acetate, can be used to lower the viscosity of the curable composition so that less reactive diluent is required to achieve the desired lower viscosity. In one embodiment, the solvent may be present at less than 10 wt % of the curable composition. When solvents are used in this manner, the curable composition is heated to drive off the solvent during or after coating and before cure. In other embodiments, the curable composition is a solvent-free composition (which may be referred to as a "100% solids" or "100% coating solids" composition).

Optionally, the curable composition can include particulate filler. The curable composition can include upto about 55 wt % of the particulate filler, which can be nanoparticles, microparticles, or a combination of nanoparticles and microparticles. The present composition of a multifunctional urethane having a reactive group equivalent weight of about 250 to 450 g/equivalent provides the desired balance of solvent resistance and hardness for engravability that is suitable for end-use as a gravure printing cylinder. The particulate can be added to provide or improve wear resistance and scratch resistance of the printing form having the cured layer of the composition. The particulate may also improve engravability, particularly by electromechanical engraving, of the cured layer of the composition. The particulate filler can be non-functionalized or functionalized. The particulate filler can be functionalized by coating or subjecting to a surface treatment with, for example, an organic onium species, to improve interaction between the filler and the one or more of the components, such as the multifunctional urethane, of the curable composition.

In some embodiments, the optional filler is nanoparticles, i.e., particles having at least one dimension less than about 1000 nm. In one embodiment, the value of the at least one dimension is between and optionally including any two of the following values: 1, 10, 50, 75, 100, 200, 300, 400, 500, 600, 650, 700, 750, 800, 850, 900, 950, and 999 nm. In one embodiment, the nanoparticle filler has at least one dimension between about 1 and about 500 nm; in some embodiments at least one dimension between about 1 and about 100 nm; and in some other embodiments at least one dimension between about 10 and about 999 nm. The nanoparticles can improve hardness and stiffness which can lead to increased wear resistance and improved engravability of a cured layer of the composition.

In other embodiments, the optional filler is microparticles that have at least one dimension equal to or greater than about 1000 nm (1 micron), and generally between about 1 µm to about 5 µm. Microparticles can be added to the curable composition as a solid lubricant to impart improved wear characteristics and scratch resistance of the cured composition layer. Microparticles may also reduce wear of electromechanical stylus, and improve engravability of the cured composition layer.

Examples of materials suitable as particulate filler that can be nanoparticles and/or microparticles, include, but are not limited to: aluminum oxides (e.g., alumina); silicas; zinc oxides; zirconium oxides; titanium oxides; magnesium oxides; tungsten oxides; tungsten carbides; silicon carbides; titanium carbides; boron nitrides; molybdenum disulfides; clays, e.g., laponite, bentonite, montmorillonite, hectorite, kaolinite, dickite, nacrite, halloysite, saponite, nontronite, beidellite, volhonskoite, sauconite, magadite, medmonite, kenyaite, vermiculite, serpentines, attapulgite, kulkeite, alletite, sepiolite, allophane, and imogolite; poly(tetrafluoroethylene) and mixtures thereof. Further examples of particulate fillers, that can also be considered pigments (that can enhance laser engravability of the cured composition layer) include graphites; carbon nanotubes; carbon black; carbon-encapsulated silica particles; carbon filaments; and mixtures thereof.

Additional examples include alumina particles functionalized with phenyl-functionalized silanes, or alumina particles functionalized with epoxy functionalized silanes, or alumina particles functionalized with vinyl functionalized silanes. Other additional examples include silica particles functionalized with phenyl-functionalized silanes, or silica particles functionalized with epoxy functionalized silanes, or silica particles functionalized with vinyl functionalized silanes; and, zirconia particles with phenyl-functionalized silanes, or zirconia particles functionalized with epoxy functionalized silanes, or zirconia particles functionalized with vinyl functionalized silanes.

The particulate filler, which is selected from nanoparticles, microparticles, or a combination of nanoparticles and microparticles, can be present in an amount between and optionally including any two of the following values: 0, 0.1, 0.2, 1, 2, 3, 4, 5, 6, 7, 8, 9, 10, 11, 12, 13, 14, 15, 16, 17, 18, 19, 20, 21, 22, 23, 24, 25, 26, 28, 29, 30, 32, 34, 36, 38, 40, 42, 44, 46, 48, 50, 52, 54, and 55 wt % based on the combined weight of the solid components in the curable composition. The nanoparticles can be present in an amount between about 0.1 and about 55 wt % in one embodiment; in an amount between about 1 and about 40 wt % in other embodiments; and in an amount between about 10 and about 45 wt % in some other embodiments, based on the combined weight of the solid components in the curable composition. The microparticles can be present in an amount between about 0.1 and about 55 wt % in one embodiment; in an amount between about 4 and about 40 wt % in some embodiments; and in an amount between about 1 and about 35 wt % in some other embodiments, based on the combined weight of the solid components in the curable composition.

In some other embodiments, the nanoparticles can be present in an amount between about 0.1 and about 50 wt % and the microparticles can be present between about 0.1 and about 5 wt %; in yet other embodiments, the nanoparticles can be present between about 0.5 to about 40 wt % and the microparticles can be present between about 0.5 and about 15 wt %; and in yet some other embodiments the nanoparticles can be present in an amount between about 1 and about 35 wt % and the microparticles can be present between about 1 and about 20 wt %, based on the combined weight of the solid components in the curable composition.

The curable composition optionally can include additives to provide or improve or enhance one or more properties of the composition and/or of the cured layer of the composition. Optional additives include adhesion promotors, slip agents, flow and leveling agents, wetting agents, plasticizers, flexibilizing agents, stabilizers, antioxidants, dispersants, dyes, and pigments. The list of additives is not intended to be fully inclusive, and other additives could be included in the curable composition. Although individually identified as separate additives, it is contemplated that one or more of the above additives can perform the same or similar function or provide substantially the same property or properties for the curable composition and/or for the cured layer of the composition. Each of the additives can provide more than one property or function for the curable composition and/or for the cured layer of the composition.

Some additives can include one or more polymerizable groups or other groups that could influence the reactive group equivalent weight, or the acrylate equivalent weight, of the curable composition. It is expected that additives having two or more polymerizable groups, such as ethylenically unsaturated groups, but in amounts less than about 5 wt %, particularly less than 3 wt %, will not significantly change the reactive group equivalent weight, or the acrylate equivalent weight, of the curable composition. So in most of the embodiments in which an additive is present, the additive should be included in the composition at a minimal level sufficient to provide the desired enhanced property without significantly influencing the equivalent weight of the composition outside of the desired range. In some instances, the additive could influence the equivalent weight if the acrylate equivalent weight of the reactive components, i.e., multifunctional urethane and optional reactive diluents, is near an end of the range for the reactive group equivalent weight, or the acrylate equivalent weight.

With the exception of one or more pigments and one or more dyes, each optional additive can be included in the curable composition at relatively small amount, less than or equal to 10 wt % in some embodiments; less than or equal to 5 wt % in other embodiments; and, less than or equal to 2 wt % in some other embodiments, based on the total solid components in the curable composition. Independently, any one of the optional additives can be present in an amount between and optionally including any two of the following values: 0, 0.01, 0.05, 0.08, 0.1, 0.2, 0.5, 0.8, 1, 1.5, 2, 3, 4, 5, 5.5, 6, 7, 8, 9, and 10, wt % based on the combined weight of the solid components in the curable composition. In most embodiments, the combined total of the additives present in the curable composition is less than 10 wt %.

An adhesion promotor is a compound that enables the curable composition to adhere to the metal surface of a print cylinder, such as a gravure print cylinder steel roll, without the need for a primer therebetween. Primerless coatings are thereby produced. In some embodiments the adhesion promotor is a polymer that includes one or more anionic groups. Phosphoric acid esters is an example of an adhesion promotor. A commercially available adhesion promoter that can be used is Sartomer CD9054, which is described by its manufacturer as a trifunctional acid ester and is available from Sartomer USA, LLC, (Exton, Pa., USA). Other non-limiting examples of adhesion promotors suitable for use include benzotriazoles, mercaptobenzoxazoles, and mercaptobenzimidazoles. If present, the adhesion promoter is included in the curable composition at about 0.1 to about 5 wt. % of the total solid components in the curable composition. Since the presence of anionic groups on the adhesion promoter could influence the acrylate equivalent weight of the curable composition, the adhesion promoter should be included at a low level so that the acrylate equivalent weight is not adjusted out of the desired range of about 250 to about 450 g/equivalent for the curable composition.

Flow and leveling agents, and/or wetting agents (which may also be referred to as surfactants), can be included to improve coating uniformity and/or the appearance of the layer of the curable composition. Non-limiting examples of flow and leveling agents, include, polyether-modified polyalkylsiloxanes. Commercially available flow and leveling agents, such as BYK® 301, BYK® 306, BYK® 331, BYK® 333, BYK® 325, BYK® 358N, BYK® 352, or BYK® 388 available from ALTANA AG (Germany), and made by BYK-USA (Wallingford, Conn., USA), are suitable for use in the composition. Wetting agents or surfactants can be anionic, cationic, non-ionic, or zwitter-ionic.

Slip agents can be included to enhance the wear and/or scratch resistance of the cured layer of the composition. Non-limiting examples of slip agents include, acrylated silicone polyether copolymers, which are commercially available under the brand name CoatoSil by Momentive Perfomance Materials Inc. (Waterford, N.Y., USA). Other slip agents include fluorinated compounds, and fluorine-containing compounds, that can be monomers or polymeris, such as, for example, the perfluoro-modified compounds that are disclosed in US Pub. No. 2014/0135524, US Pub. No. 2014/0135535, and US Pub. No. 2014/0135518.

Plasticizers and flexibilizing agents can be added to adjust the film forming properties of the composition, impart flexibility to the layer of the composition, and/or reduce shrinkage of the layer upon curing. Plasticizers can be liquid or solid, and are generally inert organic substances of low vapor pressure. An example of a plasticizer is dibutyl phthalate.

A dispersant can be added in order to disperse the filler and/or pigment and avoid flocculation and agglomeration. Dispersants suitable for use are not limited, provided that the dispersant can uniformly distribute the filler and/or pigment in the composition and is sufficiently compatible with the components in the curable composition to the extent that a suitable layer is produced. A wide range of dispersants are commercially available.

Stabilizers can be included to inhibit premature polymerization to increase shelf life and/or pot life of the curable composition. Some stabilizers function in the presence of oxygen and others function in the absence of oxygen. Suitable polymerization inhibitors include, but are not limited to, phenol type antioxidants, hindered amine light stabilizers, phosphor type antioxidants, hydroquinone monomethyl ether, alkyl and aryl-substituted hydroquinones and quinones, t-butyl-catechol or pyrogallol, naphthylamines, beta-naphthol, cuprous chloride, 2,6-di-tert-butyl-p-cresol, phenothiazine, pyridine, nitrobenzene, dinitrobenzene, p-toluquinone and chloranil. Also useful for thermal polymerization inhibitors are the nitroso compositions disclosed in U.S. Pat. No. 4,168,982. A commercial stabilizer suitable for use is Lignostab® stabilizer (from BASF) which is lignin stabilizer additive, which functions in the absence of oxygen. Since excessive addition of a polymerization inhibitor will lower the curing efficiency, the amount is preferably lower than about 2 wt %, relative to the total weight of solids of the curable layer.

One or more pigments and/or dyes can be added to the curable composition in order to enhance its laser engravability. The pigment can be present in the curable composition for laser engraving in an amount of from about 0.5 to about 55 wt %; and, in one embodiment, from about 1 to about 30 wt %. Examples of such pigments include, but are not limited to, black silicic pigments (containing carbon-encapsulated silica particles), and carbon black. Certain pigments, such as carbon black and carbon encapsulated silica particles, can also function as filler.

Specific embodiments of the present invention include, but are not limited to, the following.

In most embodiments, the curable composition includes at least the multifunctional urethane component having the reactive group equivalent weight between about 250 and about 450 g/equivalent and an initiator.

In some embodiments, the curable composition includes at least the multifunctional urethane component having the reactive group equivalent weight between about 250 and about 450 g/equivalent, and an initiator.

In some embodiments the initiator is a photoinitiator; and, in some other embodiments the initiator is a thermal initiator.

In some embodiments, the curable composition includes one or more of the multifunctional urethane component having the reactive group equivalent weight between about 255 and about 440 g/equivalent, and an initiator.

In some embodiments, the curable composition can include or can consist essentially of the at least one multifunctional urethane component, a photoinitiator, and one or more reactive diluents having a weighted average of the reactive group equivalent weight between about 250 and about 450 g/equivalent based on the total of the urethane component and the one or more reactive diluents present.

In some embodiments, the curable composition includes an acrylated urethane component having two or more (meth) acrylated reactive groups as the multifunctional urethane component.

In some embodiments, the curable composition includes at least the acrylated urethane component having the acrylate EW between about 250 and about 450 g/equivalent, and a photoinitiator.

In some embodiments, the curable composition can include or can consist essentially of two or more acrylated urethane components wherein the acrylate equivalent weight is a weighted average of acrylate EW of the two or more acrylated urethane components and between about 250 and about 450 g/equivalent, and a photoinitiator.

In some embodiments, the curable composition can include or can consist essentially of the at least one acrylated urethane component, a photoinitiator, and one or more reactive diluents, wherein the acrylate equivalent weight is a weighted average of the acrylate equivalent weight of the acrylated urethanes and the reactive diluents present, and is between about 250 and about 450 g/equivalent.

In some embodiments, the curable composition can include or can consist essentially of at least one acrylated urethane comprising at least one soft acrylated urethane component, at least one hard acrylated urethane component, a photoinitiator, and one or more reactive diluents, wherein the acrylate equivalent weight is a weighted average of the acrylate EW of the at least one acrylated urethanes and the reactive diluents present and is between about 250 and about 450 g/equivalent.

In some embodiments, the curable composition can include or can consist essentially of the at least one multifunctional urethane having at least two reactive group functionalities and that is a homo-polymer or a copolymer of a urethane oligomer and one or more of other polymers that is selected from polyesters, epoxies, and polyethers; at least one initiator; and optionally at least one reactive diluent component.

In some embodiments, the curable composition can include or can consist essentially of the at least one multifunctional urethane component; an initiator; and one or more resin modifiers; wherein the composition has a reactive group equivalent weight between about 250 and about 450 g/equivalent based on the total of the at least one urethane component and one or more reactive diluents if present.

In some embodiments, the curable composition can optionally include one or more resin modifiers independently selected from reactive diluents, monofunctional diluents, monomers, auxilliary resin modifiers, or combinations thereof.

In some embodiments, the curable composition can optionally include an auxilliary resin modifying compound that is selected from monomers and oligomers of epoxy (meth)acrylates; monomers and oligomers of polyester (meth)acrylates; monomers and oligomers of polyether (meth)acrylates; acrylate derivatives and methacrylate derivatives of isocyanates; and combinations thereof.

In some embodiments, the curable composition can include or can consist essentially of the at least one multifunctional urethane component, at least one photoinitiator, and one or more resin modifiers independently selected from reactive diluents, monofunctional diluents, monomers, and auxilliary resin modifiers; wherein the composition has a reactive group equivalent weight between about 250 and about 450 g/equivalent based on the at least one urethane component and the one or more reactive diluents if present.

In some embodiments, the curable composition can include or can consist essentially of the at least one multifunctional urethane component; an initiator; one or more resin modifiers; and, a particulate filler, wherein the composition has a reactive group equivalent weight between about 250 and about 450 g/equivalent.

In some embodiments, the curable composition can include or can consist essentially of the at least one multifunctional urethane component; at least one initiator; at least one reactive diluent component; and, particulate filler selected from nanoparticles, microparticles, and combinations thereof.

In some embodiments, the curable composition can include or can consist essentially of the at least one multifunctional urethane component; at least one photoinitiator; at least one reactive diluent component; and nanoparticles as the particulate filler.

In some embodiments, the curable composition can include or can consist essentially of the at least one multifunctional urethane component; at least one photoinitiator; at least one reactive diluent component; and microparticles as the particulate filler.

In some embodiments, the curable composition can include or can consist essentially of two or more of acrylated urethane components; one or more photoinitiators; one or more reactive diluent components; and particulate filler selected from nanoparticles, microparticles, and a combination of nanoparticles and microparticles.

In some embodiments, the cureable composition can optionally include one or more additives that is independently selected from adhesion promotors, slip agents, flow and leveling agents, wetting agents, plasticizers, flexibilizing agents, stabilizers, antioxidants, dipersants, dyes, pigments, or combinations thereof.

In some embodiments, the curable composition can include or can consist essentially of the at least one multifunctional urethane component; at least one initiator; one or more resin modifiers; a particulate filler; and optionally one or more additives, wherein the composition has a reactive group equivalent weight between about 250 and about 450 g/equivalent.

In some embodiments, the curable composition can include or can consist essentially of about 30 to about 95 wt % of at least one multifunctional urethane component; about 0.1 to about 15 wt % of at least one initiator; 0 to about 40 wt % of a resin modifier; 0 to about 55 wt % of particulate filler; and, 0 to about 10 wt % of an additive, wherein the composition has a reactive group equivalent weight between about 250 and about 450 g/equivalent.

In some embodiments, the curable composition can include or can consist essentially of about 30 to about 95 wt % of at least one multifunctional urethane; about 0.1 to about 10 wt % of at least one initiator; about 0.2 to about 40 wt % of one or more resin modifiers; about 0.1 to about 40 wt % of filler particulate; and optionally about 10 wt % total of one or more additives.

In some embodiments, the curable composition can include or can consist essentially of about 30 to about 95 wt % of one or more the multifunctional urethanes; about 0.1 to about 10 wt % of at least one photoinitiator; about 0.2 to about 40 wt % of one or more resin modifiers; about 1 to about 35 wt % of nanoparticles; and, about 1 to about 20 wt % of microparticles.

In some embodiments, the curable composition can include or can consist essentially of about 30 to about 95 wt % of one or more multifunctional urethanes; about 0.1 to about 10 wt % of at least one photoinitiator; about 0.2 to about 40 wt % total of one or more resin modifiers selected from reactive diluents, monofunctional diluents, monomers, and auxilialliary resin modifying compounds; about 1 to about 50 wt % of particulate filler.

In some embodiments, the curable composition can include or can consist essentially of about 30 to about 95 wt % of one or more multifunctional urethanes; about 0.1 to about 10 wt % of at least one photoinitiator; one or more resin modifiers selected from about 0.2 to about 40 wt % of reactive diluents, about 0.2 to about 20 wt % of monofunctional diluents, about 0.2 to about 20 wt % of monomers, and 0.2 to about 35 wt % of auxilialliary resin modifying compounds, wherein the total of the resin modifiers is less than or equal to 40 wt %; and about 0 to about 50 wt % of particulate filler.

In some embodiments, the resin modifier is a monofunctional diluent having one reactive group, and that has a molecular weight of less than 5000 and a viscosity of about 300 to about 1100 cp at room temperature, wherein the curable composition can include a monofunctional diluent selected from 0 to about 5 wt % of a monofunctional diluent having one or more flexible chains of 5 or more carbon atoms; 0 to about 15 wt % of a monofunctional diluent having a cyclic aliphatic group; 0 to about 15 wt % of a monofunctional diluent having a chain of less than 4 carbon atoms; or 0 to about 15 wt % of a monofunctional diluent having one or more rigid chains of carbon atoms, wherein the total of the monofunctional diluents present is less than or equal to 20 wt % of the solid components of the curable composition.

In some embodiments, the curable composition can include or can consist essentially of about 30 to about 95 wt % of one or more multifunctional urethanes; about 0.5 to about 10 wt % of at least one photoinitiator; about 0.2 to about 40 wt % of one or more reactive diluents; and, about 0.1 to about 55 wt % of particulate filler.

In some embodiments, the curable composition can include or can consist essentially a) about 30 to 95 total wt % of one or more of acrylated urethanes having at least two acrylate groups; b) about 0.1 to 10 wt % of one or more photoinitiators; and, c) about 5 to 35 total wt % of one or more reactive diluents, wherein the curable composition has an acrylate equivalent weight that is a weighted average of the acrylate equivalent weight of the acrylated urethanes and the reactive diluents, and is about 250 to about 450 g/equivalent;

In some embodiments, the curable composition can include or can consist essentially of a) about 30 to 70 total wt % of one or more acrylated urethanes having at least two acrylate groups; b) about 0.1 to 10 total wt % of two photoinitiators; c) about 0.2 to 35 total wt % of one or more reactive diluents; and d) about 1 to 50 total wt % of particulate filler selected from nanoparticles, microparticles, and combinations thereof, wherein the curable composition has an acrylate equivalent weight that is a weighted average of the acrylate equivalent weight of the acrylated urethanes and the reactive diluents, and that is about 250 to about 450 g/equivalent.

In some embodiments, the one or more reactive diluents is selected from isobornyl acrylate, tricyclodecanedimethanol diacrylate, ethoxylated trimethylol propane triacrylate, or combinations thereof.

In some embodiments, the particulate filler is selected from alumina, silica, and zirconia, or a combination thereof.

In some embodiments, the particulate filler is selected from non-functionalized alumina, functionalized alumina, non-functionalized silica, functionalized silica, non-functionalized zirconia, functionalized zirconia, or a combination thereof.

In yet another embodiment, the curable composition used for a printing form can include or can consist essentially of a) about 35 to 75 total wt % of one or more acrylated urethanes; b) about 1 to 10 total wt % of one or more photoinitiators; c) about 15 to 35 total wt % of one or more reactive diluents; d) about 10 to 50 wt % of particulate filler; optionally, e) 0 to 15 wt % of one or more monofunctional diluents; and optionally one or more additives selected from f) 0 to 5 wt % of an adhesion promotor; g) 0 to 5 weight percent of a flow additive; h) 0 to 2 wt % of a stabilizer; and i) 0 to 3 wt % of a slip agent, based on the total of the solid components present of the composition, wherein the curable composition has an acrylate equivalent weight of about 250 to about 450 g/equivalent, that is a weighted average acrylate equivalent weight of the one or more acrylated urethanes and the one or more reactive diluents present, and wherein the total weight percent of optional additive components f), g), h), and i) is no more than 10 wt %.

Any of the above embodiments can be combined with one or more of the other embodiments, so long as they are not mutually exclusive. The skilled person would understand which embodiments were mutually exclusive and would thus readily be able to determine the combinations of embodiments that are contemplated by the present application.

Any of the curable polymer-based compositions represented by the embodiments, specific embodiments, specific examples, and combination of embodiments discussed above can be used in the process of preparing a printing form precursor and the process of preparing a printing form from the precursor.

Process

The process of preparing a printing form includes applying the polymer-based curable composition onto the surface of a supporting substrate, to form a layer of the curable composition. The composition can be applied to the supporting substrate by various means that are well known in the art. The method of the present invention is particularly applicable to the application of the curable composition as a liquid to a supporting substrate that can be used as a printing roll or print cylinder in a rotogravure or letterpress printing process. The supporting substrate can also include a planar support sheet that is typically composed of a metal. The supporting substrate, e.g., printing roll or print cylinder, can be made of metal (e.g., aluminum or steel) or a polymeric material. Prior to the application of the curable composition to the supporting substrate, an exterior surface of the supporting substrate that receives the composition can be pretreated by means of a plasma or corona pretreatment to clean and/or alter the surface (i.e., lower the surface tension) of the supporting substrate for improved film or coating wetout and bonding strengths. Additionally or alternatively, a primer solution can be applied to the exterior surface of the supporting substrate to improve adhesion of the curable (and cured) composition to the supporting substrate. The primer solution used is not particularly limited provided that the primer suitably adheres the curable (and cured) layer to the substrate such that the layer does not separate, lift, or fragment during any of the subsequent process steps, (i.e., grinding, polishing, engraving, printing), and does not detrimentally influence the functionality of the layer. Examples of primer solutions include, but are not limited to, epoxies, polyurethanes, and polyvinyl butyrals.

The curable composition can be applied to the supporting substrate by any suitable method, including but not limited to, injection, pouring, liquid casting, jetting, immersion, spraying, vapor deposition, and coating. Examples of suitable methods of coating include spin coating, dip coating, slot die coating, roller coating, extrusion coating, brush coating, ring coating, powder coating, and blade (e.g., doctor blade) coating, all as known in the art and described in, e.g., British Patent No. 1,544,748. In one embodiment, the curable composition is applied by spraying the curable composition onto the surface of the supporting substrate, such as the printing roll or cylinder. Spraying can be accomplished through the use of a nozzle by techniques known in the art. In another embodiment, the curable composition is applied to the exterior surface of the supporting substrate by brush coating in a manner similar to that described in U.S. Pat. No. 4,007,680. In most embodiments, the curable composition is applied so as to form a continuous or seamless layer on a cylindrically-shaped supporting substrate, so as to provide a continuous print surface for the printing form (after curing and engraving).

In some embodiments, application of the curable composition occurs at room temperature. In other embodiments, application of the curable composition occurs at a temperature above room temperature. In one embodiment, the curable composition is coated as a liquid having a viscosity in the range of about 200 to about 20,000 cp at the coating temperature to form a layer on a supporting substrate. In other embodiments, the curable composition is coated as a liquid having a viscosity in the range of about 1000 to about 5000 cp at the coating temperature to form a layer on the supporting substrate. The curable composition, as applied to the surface of the supporting substrate, forms a layer that has a thickness between about 2 to about 150 mils (50.8 to 3810 μm). Optionally the thickness of the curable composition layer includes any two of the following thicknesses: 2, 4, 8, 10, 12, 16, 20, 30, 50, 100, 150, 200, 250, and 300 mils (50.8, 102, 203, 254, 305, 406, 508, 762, 1270, 2540, and 3810, μm).

The process of preparing a printing form includes curing the layer. After the curable composition is applied to the supporting substrate, the layer of the composition is cured to harden on the supporting substrate, so that the layer is capable of being engraved. Hardening of the polymeric composition occurs by crosslinking of polymer chains of the multifunctional urethane(s), and optional reactive diluent if present. In some embodiments, curing is effected by exposure of the layer to actinic radiation, which in most embodiments is ultraviolet radiation. Examples of actinic radiation include, but are not limited to, UV-A radiation, which falls within the wavelength range of from 320 nanometers (nm) to 400 nm; UV-B radiation, which is radiation having a wavelength falling in the range of from 280 nm to 320 nm; UV-C radiation, which is radiation having a wavelength falling in the range of from 100 nm to 280 nm; and UV-V radiation, which is radiation having a wavelength falling in the range of from 400 nm to 800 nm. Other examples of radiation can include electron-beam, also known as e-beam. Many artificial radiation sources emit a spectrum of radiation that contains UV radiation having wavelengths shorter than 320 nm. Actinic radiation of wavelengths shorter than 320 nm emits high energy and can cause damage to the skin and eyes. Radiation with longer wavelengths, such as UV-A or UV-V, emits lower energy and is considered safer than radiations with shorter wavelengths, such as UV-C or UV-B. The photosensitivity of most common embodiments of photosensitive elements used as precursors to the printing forms is in the UV-A and deep visible area of the spectrum, as they afford better room-light stability. In some embodiments, the actinic radiation is ultraviolet radiation between 300 and 400 nm. In some other embodiments, the actinic radiation is ultraviolet radiation between 200 and 450 nm.

One suitable method to determine if the layer of the curable composition is sufficiently cured, whether by heat or actinic radiation, is by conducting model studies of the composition based on end-use performance characteristics such as adhesion, wear resistance, and solvent resistance.

The suitability of a particular actinic radiation source is governed by the photosensitivity of the initiator and the multifunctional urethane of the curable composition. In use, the layer of the photocurable composition is exposed to actinic radiation from suitable source/s. The actinic radiation exposure time can vary from a few seconds to tens of minutes, depending upon the intensity and spectral energy distribution of the radiation, its distance from the photocurable layer, and the nature and amount (e.g., thickness of the layer) of the photocurable composition. The layer of curable composition is exposed to actinic radiation in one embodiment from about 0.5 to about 20 minutes, and in another embodiment from about 0.5 to 10 minutes. Exposure temperatures are preferably ambient or slightly higher, i.e., about 20° to about 35° C. Exposure is of sufficient duration and energy to crosslink the exposed areas of the layer down to the supporting substrate. In some embodiments, the total radiant exposure energy (sometimes also referred to as fluence, or energy density) necessary to fully cure the layer is from about 1000 to about 30000 mJoules/cm$^2$, and in other embodiments is from about 1500 to about 20000 mJoules/cm$^2$.

In some embodiments, the layer of the curable composition is cured by exposure to a source of UV-A radiation. In some other embodiments, the layer of the curable composition is cured by exposure to a source of UV radiation having a spectral output between about 250 and about 450 nm. In some other embodiments, the layer of the curable composition is cured by exposure to a source of UV-A radiation having a spectral output between about 320 and about 450 nm. In yet other embodiments, the layer of the curable composition is cured by exposure to a source of UV-A radiation having a spectral output between about 320 and about 550 nm. In some embodiments, the layer of the curable composition is cured by exposure to a source of ultraviolet radiation that provides energy density of about 1500 to about 9000 milliJoules per centimeter squared per minute (mJ/cm$^2$/minute) with exposure times from about 1.5 to about 20 minutes. In some other embodiments, the layer of the curable composition is cured by exposure to a source of ultraviolet radiation that provides energy density of about 1500 to about 7500 mJ/cm$^2$/minute with exposure times from about 10 minute to about 1 minute.

Examples of suitable visible and UV sources include carbon arcs, mercury-vapor arcs, fluorescent lamps, electron flash units, electron beam units, and lasers. and photographic flood lamps. In one embodiment, a suitable source of UV radiation is one or more mercury vapor lamps. A mercury vapor lamp can be used at a distance of about 1.5 to about 60 inch (about 3.8 to about 153 cm) in some embodiments, and about 1.5 to about 15 inch (about 3.8 to about 38.1 cm) in other embodiments, from the layer of curable composition.

In some other embodiments, curing is effected by exposure of the layer to heat, i.e., by heating to a temperature sufficient to cause the thermal initiator to react and thereby thermally polymerize the layer of the curable composition. In some embodiments, the layer of the curable composition is heated to a temperature composition at one or more temperatures in a range from above room temperature (i.e., ambient temperature) to about 250° C., i.e., above about 32° C. (90° F.) to about 250° C. The curable compositions described herein can be cured thermally (i.e., by heating) in less than about 6 hours. In some embodiments, the layer of the curable composition can be cured thermally in about 1 hour to about 2 hours. In yet other embodiments, the layer of the curable composition can be cured thermally in about 1 hour or less. Times and temperatures will depend on the specific curable composition and are readily determined by one skilled in the art. Curing at temperatures up to 250° C. also aids in driving out solvent from the curing polymer-based layer, if solvent is present in the curable polymeric composition. More specifically, the temperature for thermal curing is in a range between and optionally including any two of the following values: 30, 40, 50, 60, 70, 80, 90, 100, 110, 120, 130, 150, 170, 190, 210, 230, 250, 252° C. Curing can be carried out at one temperature, or at two temperatures sequentially in the range, for example, 1 hour at 80° C. and then 2 hours at 120° C.

The cured layer of the curable composition (after application to the surface of the supporting substrate and cured) has a thickness that is from about 2 to about 300 mils (50.8 to 7620 μm). The thickness of the cured layer is between and optionally including any two of the following thicknesses: 2, 4, 8, 10, 12, 16, 20, 50, 100, mils (50.8, 102, 203, 254, 305, 406, 508, 1270, 2540 μm).

Optionally, the cured layer can be ground and/or polished to desired thickness, cylindricity, and/or smoothness, prior to engraving as disclosed in U.S. Pat. No. 5,694,852. The smoothness of the cured layer can be reported as Rz value. In most embodiments, the smoothness of the cured layer has Rz value less than about 100 microinches (2.54 μm); and, in other embodiments, the Rz value is less than about 80 microinches (2.03 μm). Surface roughness, Rz, is measured with a surface roughness meter, by Mitutoyo America Corporation (Aurora, Ill., USA) Model SJ-210; using a detector having a measuring force 4 mN, and a stylus profile having a tip radius 5 micron and tip angle of 90 degrees. The total measurement length is 0.157 inch (0.40 cm) which is divided into 5 sampling segments according to ISO 4287: 1998 standard. Optionally, the engraved layer can be polished to remove burrs.

The process of preparing a polymer-based printing form includes engraving at least one cell into the cured layer of the composition on the supporting substrate. After the curable composition is applied to the substrate and cured, engraving of the cured composition layer removes the hardened composition in depth to form a plurality of individual cells in the layer. For gravure printing, the plurality of individual cells in the layer are for carrying ink which transfers, in whole or part, during printing of the desired image. For letterpress relief printing, the surfaces raised above the plurality of individual cells in the layer carry the ink which transfers, in whole or part, during printing of the desired image. The engraving of the plurality of cells in the cured layer on the supporting substrate provides a printing form or, equivalently, an image carrier, having a printing surface that is capable of reproducing the desired image by printing onto a substrate. The engraving to form the cells can be accomplished by any of various engraving methods known in the art. Examples include, but are not limited to, electromechanical engraving (e.g., with a diamond stylus) and laser engraving. These engraving methods can be part of an electronic engraving system. In one embodiment, engraving is carried out using a diamond stylus cutting tool. In another embodiment, direct laser non-contact engraving is used for the creation of the ink cells. The laser can be a $CO_2$, YAG, or diode type laser. In some embodiments, the present process of preparing the printing form having a cured layer of the acrylated urethane composition is advantageous in that the cured layer can be engraved using conventional engraving equipment at standard or substantially standard conditions that are used to engrave copper layer for conventional gravure cylinders.

In some embodiments, the printing form is in the shape of a cylinder or plate. In some embodiments, the supporting substrate is metal or a polymer. In most embodiments, the printing form is suited for gravure printing. Gravure printing is a method of printing in which the printing form prints from an image area, where the image area is depressed and consists of small recessed cells (or wells) to contain the ink or printing material, and the non-image area is the surface of the form. In most embodiments, the printing surface is the cured layer of the radiation-curable composition that is engraved to form an ink receptive cell surface suitable for gravure printing. It is also contemplated that in some embodiments the printing form can be suited for relief printing, including use as a letterpress printing form. Relief printing is a method of printing in which the printing form prints from an image area, where the image area of the printing form is raised and the non-image area is depressed. For printing forms useful for relief printing, the engraving of at least one cell creates the non-image area that would not carry ink for printing the desired image, and the surface raised above the cell is the image area that carries ink for printing the desired image. In some embodiments the printing surface is a relief surface suitable for relief printing.

In a further embodiment, a printing form is provided that includes a continuous print surface adjacent to or equivalently covering a supporting substrate, wherein the continuous print surface is a layer of a cured composition prepared from a UV curable composition comprising a multifunctional urethane characterized by reactive group equivalent weight between about 250 and about 450 g/equivalent, and an initiator.

In another embodiment, a process is provided for printing with the polymer-based printing form that was prepared as described above. In some embodiments, the process for printing further includes applying an ink, typically a solvent ink, to the at least one cell that has been engraved into the cured layer of the prepared printing form, and transferring ink from the cell to a printable substrate. In other embodiments, the process for printing further includes applying an ink to at least a surface above the cell that has been engraved into the cured layer of the prepared printing form, and transferring ink from the raised surface to a printable substrate. Suitable solvent inks include those based on organic solvents such as, without limitation, alcohols, hydrocarbons (e.g., toluene, heptane), acetates (e.g., ethyl acetate), and ketones (e.g., methyl ethyl ketone).

When the cured layer is not adequately solvent resistant, absorbing solvent from the solvent ink can cause the cured layer to swell excessively. Swelling excessively is detrimental to print quality and to the durability of the image carrier. The amount of swelling in terms of cured layer weight gain in the process described herein is less than about 15 wt %. The amount of swelling of the cured layer in terms of cured layer weight gain is between 0 and about 5 wt % in some embodiments; is between 0 and 8 wt % in other embodiments; is between 0 and 10 wt % in some other embodiments; and, is between 0 and 12 wt % in yet other embodiments. The structure of multifunctional urethane affects the amount of swell. For example, increasing crosslinking of the polymer chains in the multifunctional urethane can lead to reduced swell, i.e., improved solvent resistance, of the cured layer. The choice of reactive diluents can also greatly affect the swell of the cured layer.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "cm" means centimeter(s); "cp" means centipoise, a viscosity equal to 0.001 pascal·second; "Des" means Desmolux®; "Eb" means Ebecryl®; "EW" means equivalent weight; "equiv" means equivalent(s); "g" means gram(s); "HDDA" means hexamethylene diol diacrylate, "IBOA" means isobornyl acrylate, "MEK" means methyl ethyl ketone; "mg" means milligram(s); "mL" means milliliter(s); "mil" means 0.001 inch, a length equal to 0.0254 millimeters; "min" means minute(s); "mPa·s" means millipascal-second, "oz" means ounce(s); "TCDDA" means tricyclodecanedimethanol diacrylate "TMPT" means trimethylol propane triacrylate; "wt %" means weight percent(age); and "µm" means micrometer(s).

Methods

Preparation of Coating Formulations

Examples 1 Through 7 and Comparative Examples A Through C

The resin components and additives (e.g., Sartomer CD9054, Ethoxylated TMPT) were weighed into a glass jar.

Into a separate jar were weighed, the photoinitiators, Irgacure® 819 and Irgacure® 184. These were then dissolved in the reactive diluent of choice, TCDDA, HDDA or IBOA. The photoinitiator package was then added to the first jar containing the resin components and mixed by hand. A high shear mixer was then used to completely blend the components. The contents were then transferred to a round bottom flask and degassed by application of light vacuum and slight warming to 50° C. while magnetically stirring. The degassed sample was then used in the coating procedure described below for making test cylinders and solvent uptake coupons.

Examples 8-43

21.0 g of the two designated acrylated urethanes in the desired proportion (for example, 18.9 g Resin 1 and 2.1 g Resin 2 for a 90:10 ratio) were weighed out into a 1 oz (30 mL) glass jar. The lid was tightly closed and taped and the jar was warmed in a water bath at about 55° C. for a few minutes until the resins were soft and flowable. Into a separate 20 mL glass vial was weighed out 0.3 g of Irgacure® 819, 0.6 g of Irgacure® 184, 0.45 g of ethoxylated TMPT, and 6.3 g of TCDDA. The mixture was stirred while warming up in a water bath at 60° C. until a clear solution was formed. This second solution was then added to the mixture of Resins 1 and 2, and 0.9 g of Sartomer CD9054 was added. The resulting mixture was stirred manually until completely homogeneous. The mixture was then transferred into a 200 mL one neck flask equipped with a magnet. While warming the flask in a water bath at about 50° C. and stirring magnetically, low vacuum was applied to degas the solution. The resulting formulation was used to prepare samples for solvent resistance studies and to coat gravure cylinders.

Viscosity

Curable resin compositions were prepared and approximately 10 g was placed in the well of a Brookfield viscometer (Model LV) and equilibrated at 25° C. Viscosity in centipoise (1 cp=1 mPa·s) was determined as the ratio of shear stress to shear rate measured using spindle SC4-18 suspended in the coating composition. Spindle speed was chosen to give a % torque of 50 to 80%. The composition was considered to be coatable on a cylinder if its viscosity was in the range of 200 to 3500 cp at the coating temperature.

Solvent Resistance

Curable compositions were prepared and coated on an aluminum foil sheet support using a drawdown bar with a 15 to 20 mil (381-508 µm) gap to form a polymeric film (i.e., layer) on the support. The polymeric film samples were cured according to specifications in the Example, and peeled from the support. Film fragments (typically 50-100 mg) were weighed into jars containing 10-20 mL of specified solvent. The film fragments were immersed for 7 days, then blotted dry and weighed. The wt % change was calculated as:

100*[weight(7 day)−weight(initial)]/weight(initial).

The composition had good solvent resistance if, after 7 days in the solvent, the wt % change of the fragments was less than 15%.

The curable composition to be tested was mixed as described above. A clean sheet of aluminum foil or polyimide film was then placed on a flat surface. About 20 mL of the formulation was poured evenly in about a 6 inch (15 cm) line. A 6 inch draw down blade set at 6 µm was then pulled down the length of the aluminum foil to get an even 6 µm film. The film was transferred to a UV curing chamber consisting of a ventilated box and a Fusion 300 W/in lamp equipped with a "D" bulb (Fusion UV Systems, Inc., Gaithersburg, Md., USA). The sample was irradiated for 0.5-4 min. The cured film was then peeled from the aluminum foil and cut into small strips of about 2 cm×3 cm. The strips are weighed to get a starting weight and then immersed in the desired test solvent in capped 1 oz (30 mL) jars for 7 days. After 7 days the samples were removed from the jars blotted dry with a paper towel and weighed to give a final weight. The difference as % weight gain was reported.

Engravability

Curable compositions were prepared, coated onto a cylinder, cured and engraved as indicated. The engraved area was examined microscopically, and at least about 20 to 80 cells were examined to determine the minimum cell wall thickness. A cured resin sample was deemed to have good engravability if engraving of the sample to create cells at 170 to 200 lines per inch could be achieved with an average cell wall thickness of 25 µm or less.

Wear

An in-house wear test was established to mimic a typical gravure printing process. For the wear test, the (engraved) cylinder, which has a cured layer of the composition, was rotated, partially immersed in the ink tray, and was contacting a steel doctor blade once per revolution. The ink used for the test was Multiprint White ink from Del Val Ink and Color Inc. The cell area of the engraved cylinder was measured before and after 300,000 revolutions (unless otherwise noted) to monitor the extent of wear with a Hirox KH-7700 microscope. Wear is reported as a percent reduction in cell area. The cured layer was considered to have acceptable wear resistance if the reduction in cell area induced by the in-house tester was less than 10%.

Print Quality

Print quality was determined for a long print run, i.e., greater than 100,000 impressions, and is reported in terms of number of impressions until the print quality (considering characteristics such as sharpness, smearing, etc.) was visually unacceptable.

Materials

The following materials were obtained from Cytec Industries Inc., Woodland Park N.J., USA:

Ebecryl® 220 is a hexafunctional aromatic urethane acrylate.

Ebecryl® 270 is an aliphatic urethane diacrylate.

Ebecryl® 4827 is an aromatic urethane diacrylate.

Ebecryl® 8210 is a low viscosity aliphatic urethane acrylate that contains primary hydroxyl groups.

Ebecryl® 8301R is a hexafunctional aliphatic urethane acrylate.

Ebecryl® 8402 is a low viscosity aliphatic urethane diacrylate.

Ebecryl® 8405 is an aliphatic urethane tetraacrylate diluted 20% by weight with the reactive diluent 1,6-hexanediol diacrylate.

Ebecryl® 8701 is an aliphatic urethane triacrylate.

Ebecryl® 8808 is an undiluted aliphatic urethane diacrylate.

The following materials were obtained from Bayer MaterialScience AG, Leverkusen, Germany:

Desmolux® XP-2683/1 (may also be referred to herein as Des2683 or Desmolus 2683/1) is a copolymer having a polyester core with aliphatic urethane acrylate side chains or ends, supplied at 65% in isobornyl acrylate ("IBOA"), having viscosity at 23° C. approximately 35,000 mPa·s Desmolux® XP-2666 (may also be referred to herein as Des2666) is an aliphatic allophanate based urethane acrylate, having viscosity at 23° C. approximately 60,000 MPa·s.

Desmolux® U500 is an aromatic urethane acrylate, having viscosity at 23° C. approximately 6,000 mPa·s.

Desmolux XP2587 is an aliphatic urethane acrylate, having viscosity at 23° C. approximately 1500 mPa·s.

The following materials were obtained from Sigma-Aldrich Co. LLC, St. Louis, Mo., USA ("Aldrich"):

HDDA, 1,6-Hexanediol diacrylate (CAS Reg. No. 13048-33-4)

Ethoxylated TMPT (ethoxylated trimethylolpropane triacrylate) (CAS Reg. No. 28961-43-5)

Isobornyl acrylate, referred to herein as "IBOA", (CAS Reg. No. 5888-33-5)

Methyl ethyl ketone, referred to herein as "MEK", (CAS Reg. No. 78-93-3)

n-Butyl acetate, referred to herein as "butyl acetate", (CAS Reg. No. 123-86-4)

TCDDA, tricyclodecane diacrylate,

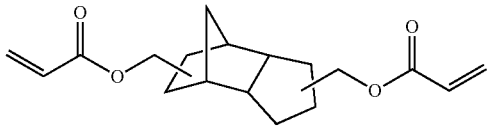

was obtained from Cytec Industries Inc (Woodland Park, N.J., USA) as Ebecryl® 130 or from Sigma-Aldrich Co.

Irgacure® 819 and Irgacure® 184 are photoinitiators and were obtained from Ciba Inc., now part of BASF, and are currently available from BASF SE, (Wyandotte, Mich., USA). Sartomer CD9054 is a trifunctional acid ester adhesion promoter, obtained from Sartomer USA, LLC, (Exton, Pa., USA).

Organosilicasol™ MEK-ST-L is colloidal silica, 40-50 nm particle size, mono-dispersed in methyl ethyl ketone (30-31 wt %), obtained from Nissan Chemical America Corporation, (Houston, Tex., USA).

BYK® 388 is a flow promoter, obtained from BYK-CHEMIE, (Wallingford, Conn., USA).

NanoDur® X1130 is a dispersion of aluminum oxide nanoparticles, supplied as a colloidal dispersion at 50% in 1,2-propanediol monomethyl ether acetate, and was obtained from Nanophase Technologies Corporation, (Romeoville, Ill., USA).

Examples 1-7

Curable compositions were prepared, cured, engraved, and tested as described above. The curable compositions are shown below for each Example. Results are presented in Table 1.

Example 1

| Material | Wt (g) | Wt solids (g) | Wt % solids |
|---|---|---|---|
| Ebecryl® 8701 | 45 | 45 | 82.4 |
| Butyl Acetate | 2.1 | 0.0 | |
| Ethoxylated TMPT | 1 | 1.0 | 1.8 |
| Irgacure® 819 | 0.5 | 0.5 | 0.9 |
| Irgacure® 184 | 1.0 | 1.0 | 1.8 |
| Sartomer CD9054 | 2.1 | 2.1 | 3.8 |
| Organosilicasol™ MEK-ST-L | 16.2 | 5 | 9.1 |
| Total | | 54.6 | |

Example 2

| Material | Wt (g) | Wt % |
|---|---|---|
| Ebecryl® 270 | 2.8 | 4.3 |
| Ebecryl® 8701 | 44.4 | 68.8 |
| TCDDA | 13.5 | 20.9 |
| Irgacure® 819 | 0.6 | 0.9 |
| Irgacure® 184 | 1.3 | 2 |
| Sartomer CD9054 | 1.9 | 2.9 |
| Total | 64.5 | |

Example 3

| Material | Wt (g) | Wt Solids (g) | Wt % solids |
|---|---|---|---|
| Desmolux® 2683/1 | 3.5 | 3.5 | 7.8 |
| Ebecryl® 8701 | 33.7 | 33.7 | 75.4 |
| Acetone | 1.6 | 0 | |
| Organosilicasol® MEK-ST-L | 12.7 | 3.9 | 8.7 |
| Ethoxylated TMPT | 0.8 | 0.8 | 1.8 |
| Irgacure® 819 | 0.4 | 0.4 | 0.9 |
| Irgacure® 184 | 0.8 | 0.8 | 1.8 |
| Sartomer CD9054 | 1.6 | 1.6 | 3.6 |
| Butyl Acetate | 3.0 | 0 | |
| Total | | 44.7 | |

Example 4

| Material | Wt (g) | Wt % |
|---|---|---|
| Ebecryl® 8402 | 5.8 | 8.5 |
| Ebecryl® 8701 | 45.2 | 66.3 |
| TCDDA | 13.7 | 20.1 |
| Irgacure® 819 | 0.5 | 0.7 |
| Irgacure® 184 | 1.0 | 1.5 |
| Sartomer CD9054 | 2.0 | 2.9 |
| Total | 68.2 | |

Example 5

| Material | Wt (g) | Wt % |
|---|---|---|
| Ebecryl® 270 | 5.7 | 4.4 |
| Ebecryl® 8701 | 88.9 | 68.8 |
| TCDDA | 27 | 20.9 |
| Irgacure® 819 | 1.3 | 1 |
| Irgacure® 184 | 2.5 | 1.9 |
| Sartomer CD9054 | 3.8 | 2.9 |
| Total | 129.2 | |

Example 6

| Material | Wt (g) | Wt % |
| --- | --- | --- |
| Desmolux ® 2683/1 | 12 | 33.8 |
| Ebecryl ® 8701 | 36 | 55 |
| TCDDA | 12.7 | 19.4 |
| Ethoxylated TMPT | 0.9 | 1.4 |
| Irgacure ® 819 | 0.6 | 0.9 |
| Irgacure ® 184 | 1.2 | 1.8 |
| Sartomer CD9054 | 1.7 | 2.6 |
| BYK ® 388 | 0.3 | 0.5 |
| Total | 65.4 | |

Example 7

| Material | Wt (g) | Wt Solids (g) | Wt % |
| --- | --- | --- | --- |
| Desmolux ® 2683/1 | 34.6 | 34.6 | 49.5 |
| Ebecryl ® 8701 | 14.9 | 14.9 | 21.3 |
| IBOA | 10 | 10 | 14.3 |
| Ethoxylated TMPT | 1.1 | 1.1 | 1.6 |
| Irgacure ® 819 | .5 | 0.5 | 0.7 |
| Irgacure ® 184 | 1 | 1 | 1.4 |
| Sartomer CD9054 | 2.3 | 2.3 | 3.3 |
| Organosilicasol ® MEK-ST-L | 17.8 | 5.5 | 7.9 |
| Total | | 69.9 | |

TABLE 1

| Example | Equivalent Weight (g/equiv) | MEK uptake (% wt gain) | Average wall thickness (μm) | Wear (%) |
| --- | --- | --- | --- | --- |
| 1 | 398.3 | 8.7 | 17 | not done |
| 2 | 418 | 4.7 | 14 | 4.7 |
| 3 | 410 | 5.1 | 20 | 0.3 |
| 4 | 426 | 8.0 | 17 | 4.5 |
| 5 | 415 | 4.7 | 16 | 4.7 |
| 6 | 376 | 14.2 | 25 | 1.4 |
| 7 | 385 | 13.4 | 27 | 3.1 |

Examples 1-4 demonstrated very good solvent resistance to MEK, which is an aggressive solvent, very good engravability by forming relatively thin average wall thickness, and acceptable wear resistance.

Examples 6 and 7 were also underwent solvent resistance testing in toluene as the solvent. The solvent resistance reported as toluene uptake for Example 6 was 0.5% wt gain, and for Example 7 was 1.2% wt gain. Although Example 6 and 7 were borderline for engravability as determined by the average wall thickness and borderline for acceptable for solvent resistance to MEK, these Examples demonstrated excellent solvent resistance to toluene and very good wear resistance. It is expected that in some instances, the compositions of Examples 6 and 7 would engrave acceptably and print with inks that include a solvent less aggressive than MEK.

Comparative Examples A-C

Comparative Examples A through C demonstrate compositions that are cured to form resins that are unsatisfactory in terms of MEK uptake, poor engravability, and/or poor print quality. The composition is given below for each Comparative Example, and results are presented in Table 2.

Comp. Ex. A

| Material | Wt (g) | Wt Solids (g) | Wt % solids |
| --- | --- | --- | --- |
| Desmolux ® 2683/1 | 37.5 | 37.5 | 67.9 |
| TCDDA | 4.5 | 4.5 | 8.2 |
| Organosilicasol ™ MEK-ST-L | 13.5 | 9.4 | 17.0 |
| Ethoxylated TMPT | 0.8 | 0.8 | 1.4 |
| Irgacure ® 819 | 0.4 | 0.4 | 0.7 |
| Irgacure ® 184 | 0.8 | 0.8 | 1.4 |
| Sartomer CD9054 | 1.8 | 1.8 | 3.3 |
| Butyl Acetate | 1.6 | 0 | |
| Total | | 55.2 | |

Comp. Ex. B

| Material | Wt (g) | Wt Solids (g) | Wt % solids |
| --- | --- | --- | --- |
| Desmolux ® 2683/1 | 45 | 45 | 85.1 |
| NanoDur ® X1130 | 6.6 | 3.3 | 6.2 |
| Ethoxylated TMPT | 1.0 | 1.0 | 1.9 |
| Irgacure ® 819 | 0.5 | 0.5 | 0.9 |
| Irgacure ® 184 | 1.0 | 1.0 | 1.8 |
| Sartomer 9054 | 2.1 | 2.1 | 4.0 |
| Butyl Acetate | 4.5 | 0.0 | |
| Total | | 52.9 | |

Comp. Ex. C

| Material | Wt (g) | Wt % |
| --- | --- | --- |
| Desmolux ® 2683/1 | 15 | 22.1 |
| Ebecryl ® 8701 | 35 | 51.5 |
| TCDDA | 12.8 | 18.9 |
| Ethoxylated TMPT | 1.0 | 1.5 |
| Irgacure ® 819 | 0.7 | 1 |
| Irgacure ® 184 | 1.3 | 2 |
| Sartomer CD9054 | 1.8 | 2.7 |
| BYK ® 388 | 0.3 | 0.4 |
| Total | 67.9 | |

TABLE 2

| Comparative Example | Equiv. Wt. (g/equiv) | MEK uptake (% wt gain) | Toluene uptake (% wt gain) | Wear (%) | Average wall thickness (μm) |
| --- | --- | --- | --- | --- | --- |
| A | 563 | 9.8 | 28 | 3.3 | 10 |
| B | 636 | 15.9 | 13.4 | 3 | 12 |
| C | 541.1 | 25 | 31 | 8.8 | 15 |

Comparative Examples A-C, which all had an acrylate equivalent weight that was outside the uppermost limit of 450 of the present invention, demonstrated unacceptable solvent resistance in at least one of the solvents of MEK or toluene. Comparative Example A demonstrated significantly unacceptable solvent resistance to toluene. Comparative Example B demonstrated borderline performance for solvent resistance in both MEK and toluene. Comparative Example C demonstrated significantly unacceptable solvent resistance to both MEK and toluene.

Examples 8-43

A series of formulations was made to determine the effects of equivalent weight of acrylate groups on engravability and solvent uptake. For this study, formulations were made using combinations of two resins a multifunctional urethane acrylate having functionality 3 or higher, and a difunctional urethane acrylate. These two resins were used in weight ratios of the resins varying from 90:10; 75:25; 65:35; and 50:50. In some formulations, one or both of the resins included a reactive diluent, which is reflected in the acrylated equivalent weight value reported for the resins and reactive diluent/s. All other components of the formulation including photoinitiator (Irgacure® 819 and Irgacure® 184), adhesion promotor (Sartomer CD9054), and diluents (ethoxylated TMPT and TCDDA), were held constant. Formulations were made and tested for MEK uptake as described above. A subset was coated onto gravure cylinders and tested for engravability.

| Resin or Diluent | Functionality | Molecular Weight |
|---|---|---|
| Des 2666 | 4 | 1100 |
| Des 2683 | 2 | 1300 |
| Des U500 | 3.9 | 2000 |
| Eb 8405 | 4 | 2700 |
| Eb 8210 | 4 | 600 |
| Eb 8701 | 3 | 1200 |
| Eb 4827 | 2 | 1200 |
| Eb 8402 | 2 | 1000 |
| Eb 8808 | 2 | 1200 |
| Eb 220 | 6 | 1000 |
| Des 2683 | 2 | 1300 |
| Eb 8301R | 6 | 1500 |
| Et-TMPT | 3 | 692 |
| TCDDA | 2 | 304.4 |

Results are presented in Table 3 and FIG. 1.

TABLE 3

| Example | Acrylated Urethane Resin proportions by wt. | EW of Acrylated Urethanes only | EW of Acrylated Urethanes and Reactive Diluents | Average Minimum Wall Thickness (μm) | MEK uptake (% wt. gain) |
|---|---|---|---|---|---|
| 8 | 75:25 Des2666:Des2683 | 369 | 287 | | 13.4 |
| 9 | 90:10 Des2666:Des2683 | 313 | 265 | 23 | 10.8 |
| 10 | 65:35 Des2666:Des2683 | 406 | 303 | | 13.5 |
| 11 | 50:50 Des2666:Des2683 | 463 | 326 | | 12.5 |
| 12 | 75:25 DesU500:Des2683 | 547 | 428 | | 13.9 |
| 13 | 90:10 DesU500:Des2683 | 527 | 434 | 20 | 12.1 |
| 14 | 65:35 DesU500:Des2683 | 561 | 425 | | 14 |
| 15 | 50:50 DesU500:Des2683 | 581 | 420 | | 15 |
| 16 | 75:25 Eb 8405:Des2683 | 669 | 461 | | 15.7 |
| 17 | 90:10 Eb 8405:Des2683 | 673 | 473 | | 16.8 |
| 18 | 65:35 Eb 8405:Des2683 | 666 | 454 | | 17.5 |
| 19 | 50:50 Eb 8405:Des2683 | 663 | 442 | | 19.2 |
| 20 | 75:25 Eb 8210:Des2683 | 275 | 213 | 32.7 | 0.8 |
| 21 | 90:10 Eb 8210:Des2683 | 200 | 176 | 32.5 | 1.3 |
| 22 | 65:35 Eb 8210:Des2683 | 325 | 239 | 29.8 | 3.4 |
| 23 | 50:50 Eb 8210:Des2683 | 400 | 276 | 23 | 8.5 |
| 24 | 75:25 Eb 8701:Eb4827 | 450 | 387 | | 14.6 |
| 25 | 90:10 Eb 8701:Eb4827 | 420 | 364 | 23 | 6.8 |
| 26 | 65:35 Eb 8701:Eb4827 | 470 | 403 | | 12.7 |
| 27 | 50:50 Eb 8701:Eb4827 | 500 | 427 | | 12.8 |
| 28 | 75:25 Eb 8701:Eb8402 | 425 | 368 | 30 | 12.6 |
| 29 | 90:10 Eb 8701:Eb8402 | 410 | 356 | 34 | 7 |
| 30 | 65:35 Eb 8701:Eb8402 | 435 | 376 | 24 | 13.3 |

TABLE 3-continued

| Example | Acrylated Urethane Resin proportions by wt. | EW of Acrylated Urethanes only | EW of Acrylated Urethanes and Reactive Diluents | Average Minimum Wall Thickness (μm) | MEK uptake (% wt. gain) |
|---|---|---|---|---|---|
| 31 | 50:50 Eb 8701:Eb8402 | 450 | 387 | | 13.6 |
| 32 | 75:25 Eb 8701:Eb8808 | 450 | 387 | | 13.5 |
| 33 | 90:10 Eb 8701:Eb8808 | 420 | 364 | | 12.6 |
| 34 | 65:35 Eb 8701:Eb8808 | 470 | 403 | | 13.6 |
| 35 | 50:50 Eb 8701:Eb8808 | 500 | 427 | | 14.1 |
| 36 | 75:25 Eb 220:Des2683 | 288 | 223 | | 0.6 |
| 37 | 90:10 Eb 220:Des2683 | 215 | 187 | | 0.3 |
| 38 | 65:35 Eb 220:Des2683 | 336 | 247 | 30 | 1.1 |
| 39 | 50:50 Eb 220:Des2683 | 408 | 283 | | 7.2 |
| 40 | 75:25 Eb 8301R:Des2683 | 350 | 273 | | 1.1 |
| 41 | 90:10 Eb 8301R:Des2683 | 290 | 247 | | 0.5 |
| 42 | 65:35 Eb 8301R:Des2683 | 390 | 290 | | 7 |
| 43 | 50:50 Eb 8301R:Des2683 | 450 | 316 | | 8.1 |

The data from Examples 8 through 43 were plotted in FIG. 1 as acrylate equivalent weight of the acrylated urethane and the reactive diluents of the curable composition versus MEK solvent uptake, which is reported as a percentage increase in weight gain, and average minimum wall thickness. The data show that the compositions of acrylated urethanes and reactive diluents having a weighted average acrylate EW of greater than about 450 exhibits poor solvent resistance, i.e., MEK solvent uptake is greater than about 15%; and having an acrylate EW of less than about 250 exhibits poor engravability, i.e., minimum wall width is too thick at about 28 micrometers or more. Further, the data show that the compositions of acrylated urethanes and reactive diluents having a weighted average acrylate EW of between about 250 and about 450 exhibited both good solvent resistance at less than 15 wt % MEK solvent uptake and engravability at minimum average cell wall thickness of about 25 microns or less.

Table 3 also shows the acrylate equivalent weight of the acrylated urethane resins alone, without accounting for the functionality of the reactive diluents. Although the acrylate equivalent weight of the acrylated urethane resins alone tracks the solvent resistance and engravability of the cured compositions with the acrylate equivalent weight of the acrylated urethane and reactive diluents combined as described above, this demonstrated the need to account for the reactive diluents when determining the desired range for the acrylate equivalent weight of the curable composition.

Example 44

The following Example demonstrates the differences in hardness and elastic modulus of a layer of the cured resin according to the present invention compared to an elastomeric printing plate for flexographic printing.

Resin compositions as described in the following table that contain an acrylated urethane and at least a photoinitiator according to the present invention were prepared as follows. The resin components and additives were weighed into a glass jar. Into a separate jar were weighed, the photoinitiator/s. These were then dissolved in the reactive diluent of choice. The photoinitiator package was then added to the first jar containing the resin components and mixed by hand. A high shear mixer was then used to completely blend the components. The contents were then transferred to a round bottom flask and degassed by application of light vacuum and slight warming to 50° C. while magnetically stirring. The prepared curable compositions were coated onto a metal plate forming a layer having a dried thickness of 6 to 8 mils (0.015-0.020 cm). The layer of the resin composition was cured by blanket exposure on the Fusion 300 W/in unit with a "D" bulb as described above on a conveyor belt with a total ultraviolet radiation exposure of 1.9 Joules/cm² and a peak power of 4.49 W/cm².

| Ingredient | Example 44A (wt. %) | Example 44B (wt. %) | Example 44C (wt. %) |
|---|---|---|---|
| Ebecryl 8701 | 37.8 | | |
| Desmolux 2683/1 | 16.2 | | 7.1 |
| Desmolux U500 | | | 64.0 |
| Desmolux 2587 | | 93.7 | |
| Ebecryl 130 | 38.9 | | 21.3 |
| Ethoxylated TMPT (Mn 606) | 1.4 | | 1.5 |
| Irgacure 819 | 0.9 | 1.1 | 1.0 |
| Irgacure 184 | 1.8 | 2.1 | 2.0 |
| Sartomer CD 9054 | 2.5 | 3.1 | 3.1 |
| BYK388 | 0.5 | | |
| Reactive Group Equivalent Weight | 352 | | 432 |

A CYREL® elastomeric photopolymeric printing plate, type 45NOW, was used as a Comparative. The CYREL elastomeric printing plate includes a polyethylene terephthalate support, and on or adjacent the support a layer of a photopolymerizable composition containing an elastomeric binder of a poly (styrene-isoprene-styrene) block copolymer, one or more monomers, a photoinitiator, and other additives. After a coversheet on a side of the photopolymerizable layer that is opposite the support is removed, the plate was exposed to UV radiation on the front side (without a mask) and through the support, i.e., back side exposure, to cure the photopolymerizable layer. A sample of the plate was cut and mounted onto a glass slide for testing on the NanoHardness Indenter as described below.

The CYREL 45NOW plate has a thickness of about 0.045 inch, which is about the thickness of the support and the exposed photopolymerizable layer. A separate sample of the CYREL plate that was exposed to ultraviolet radiation to polymerize the photopolymerizable layer in depth, has an average durometer of about 77.2 as measured on an instrument that was calibrated and configured for Shore A measurement. The reported durometer is an average of 2 samples of the plate that were tested 5 times each. The instrument that was calibrated and configured for Shore A measurement is a Zwick digital Shore electronic hardness tester (Shore A) from Zwick USA (Kennesay, Ga., USA).

Although the photopolymerizable composition of the CYREL elastomeric printing plate is not a polyurethane-based composition, and therefore not a direct comparison to the resin compositions of the present invention, the Applicants believe that any composition that is formulated for use as a relief printing layer for flexographic printing will have substantially the same or very similar properties, in particular hardness and elastic modulus, regardless if the binder for the composition is based on polyurethanes or elastomeric block copolymers, such as the binder used in the CYREL printing plate. Typically, the hardness of photopolymerizable elastomeric printing plates for flexographic printing is reported as durometer and tested on an instrument that was calibrated and configured for Shore A measurement. Durometer is typically used as a measure of hardness in polymers, elastomers, and rubbers. At the time of this filing, the Applicants are not aware of commercially-available relief forming elastomeric printing plate products for flexographic printing that include a layer of an elastomeric composition that is based upon polyurethanes to form the relief printing surface.

Note that samples of three other types of CYREL elastomeric photopolymeric printing plates, that included 250 DPC, 45 DFM, and 45 DFR were unable to be tested alongside the 45NOW sample on the UNHT indenter. An attempt to apply the load to these three samples of elastomeric printing plates, was limited by the displacement range of the UNHT and the displacement railed. It was not possible to find a compromise set of conditions to test both the urethane resin samples of Example 44 and these three additional CYREL samples. These three elastomeric plate samples were exposed and tested as described above on the Zwick digital Shore hardness tester for durometer. The average durometer of the 250 DPC was 34.4; of 45 DFM was 67.4; and of 45 DFR was 73.9 by the Zwick tester that was configured for Shore A measurement.

Samples of each of the cured resins of Examples 44A-44C, and the Comparative were tested on an indenter, according to ASTM standard E2546-07. The indenter was from CSM Instruments, UNHT—Ultra NanoHardness Tester, that was equipped with a Berkovich indenter. The Berkovitch indenter is made of diamond and has a shape of a three-sided pyramid that forms a sharp point.

The Ultra NanoHardness Test indenter is based on an architecture that uses two independent vertical axes: one axis dedicated to the indentation itself and one axis used for active surface referencing. Each axis has its own actuator, displacement and load sensors. For both axes, the displacement is applied via separate piezo actuators. The load on the indenter and the reference is obtained from the displacement of the springs, measured with capacitive sensors. A spherical reference (with typical diameter of 3 mm) is located 2.5 mm (9 mm in special case) apart from the indenter. The displacement of the indenter is measured relative to the reference through a differential capacitive sensor. The force applied on the reference is maintained on a constant level, ensuring that the reference follows precisely every displacement of the sample surface. Continuous control of normal force on both the indenter and the reference is ensured by precise feedback loops. The crucial components used in the measurement head are made of Zerodur®, a material with extremely low coefficient of thermal expansion ($0.01 \times 10^{-6}$ K-1 over the range 0° C.-100° C.). Since the problems of thermal drift and frame compliance have been almost completely eliminated in the UNHT, all measurements contain only raw data without any software or hardware correction of thermal drift or frame compliance.

This instrument brings the known geometry indenter into contact with the surface (of the sample) then applies and removes a selected load at prescribed rates and generates load and unload curves respectively. The load and unload curves are used to calculate the hardness and the modulus of elasticity of each of the cured polymer-based layers of the Examples and the Comparative. Material properties were calculated by the indentation software with Oliver & Pharr method using the penetration-force curves and the indenter geometry. Testing was conducted at room temperature. For each sample, a load of 2 miliNewtons was applied with a 30 second linear load, 120 second pause, and a 2 second linear unload. Each sample of the Examples of 44A-44C were indented 25 times, and the Comparative was indented 14 times. The indentation curves were very tightly grouped for all samples and had low standard deviations which is indicative of homogeneous material. The average of the hardness and modulus of elasticity are reported below.

| | Example 44A | Example 44B | Example 44C | Comparative |
|---|---|---|---|---|
| Average Hardness (Mega Pascals) | 187.3 | 69.7 | 46.6 | 1.33 |
| Hardness Standard Deviation | 3.83 | 1.83 | 1.52 | 0.04 |
| Average Modulus of Elasticity (Mega Pascals) | 3843.8 | 1965.2 | 1765 | 9.1 |
| Modulus of Elasticity Standard Deviation | 65.5 | 32.3 | 46.3 | 0.2 |

The cured polymer-based compositions of the present invention have a significantly different hardness and modulus of elasticity than that of the Comparative. The standard deviation of the hardness and modulus of elasticity shows the reproducibility of the test. The cured compositions of Examples 44A-44C had a hardness that was about 36 to 140 times greater than the hardness of the Comparative. The results demonstrated that the cured polymeric layer of compositions according to the present invention that have a hardness that is greater than about 40 megaPascals are suitable for use as a polymeric-based printing form for gravure printing. Further, it is contemplated that a cured polymeric layer having a hardness of about 15 to about 40 megaPascals, (and still about 10-31 times greater than the hardness for a flexographic printing form) may be suitable for some embodiments of printing forms, e.g., for letterpress printing and even for some less-stringent gravure printing, but that are not used for flexographic printing. It is contemplated that a cured polymeric layer having a hardness of about 30 to about 200 megaPascals is suitable for embodiments of printing forms used for gravure printing. The cured compositions of Examples 44A-44C had a modulus of elasticity that was 190 to 420 times greater than the modulus of elasticity of the Comparative. The cured polymer-based compositions of the present invention have a modulus of elasticity of at least about 1700 megaPascals.

This Example demonstrated that properties such as hardness and modulus of elasticity are significantly different for a printing form having a cured polymeric layer for end-use in gravure printing than for elastomeric printing plates for end-use in flexographic printing. Properties such as hardness and elastic modulus track with performance of the printing forms in end-use.

What is claimed is:

1. A printing form comprising a supporting substrate and a print surface adjacent to the supporting substrate, wherein the print surface is a cured layer of a curable composition comprising a multifunctional urethane, and an initiator, and optionally a reactive diluent, wherein the composition is characterized by a reactive group equivalent weight of the multifunctional urethane and the optional reactive diluent that is between 250 and 450 g/equivalent, and wherein the initiator is a photoinitiator, and is not an organic epoxide.

2. The printing form of claim 1 wherein the multifunctional urethane has two or more ethylenically unsaturated groups, and the curable composition further comprises one or more reactive diluents having two or more ethylenically unsaturated groups, and the reactive group equivalent weight of the curable composition is the weighted average of the reactive group equivalent weights of the one or more reactive diluents and the multifunctional urethane, and is between 250 and 450 g/equivalent.

3. The printing form of claim 1 wherein the multifunctional urethane is a multifunctional acrylated urethane having two or more (meth)acrylate groups, and the reactive group equivalent weight is an acrylate equivalent weight that is between 250 and 450 g/equivalent.

4. The printing form of claim 1 wherein the curable composition further comprises one or more resin modifiers independently selected from the reactive diluent, monofunctional diluents, monomers, auxiliary resin modifying compounds, or combinations thereof.

5. The printing form of claim 1 wherein the multifunctional urethane comprises one or more multifunctional acrylated urethanes having two or more (meth)acrylate groups, the initiator is a photoinitiator; and the optional reactive diluent comprises one or more reactive diluents having two or more (meth)acrylate groups, and the reactive group equivalent weight of the composition is an acrylate equivalent weight that is the weighted average of the acrylate equivalent weights of the one or more reactive diluents and the multifunctional acrylated urethane, and is between 250 and 450 g/equivalent.

6. The printing form of claim 1 wherein the multifunctional urethane comprises one or more multifunctional acrylated urethanes having two or more (meth)acrylate groups, at least one reactive diluent having two or more (meth)acrylate groups, and an auxiliary resin modifying compound having two or more (meth)acrylate groups, and wherein the reactive group equivalent weight of the curable composition is an acrylate equivalent weight that is the weighted average of the acrylate equivalent weights of the one or more multifunctional acrylated urethanes, the at least one reactive diluent, and the auxiliary resin modifying compound, and is between 250 and 450 g/equivalent.

7. The printing form of claim 1 wherein the curable composition further comprises at least one reactive diluent that has a viscosity of less than or equal to 300 cp and is selected from the group of difunctional (meth)acrylate monomers, difunctional (meth)acrylate oligomers, trifunctional (meth)acrylate monomers, trifunctional (meth)acrylate oligomers, and combinations thereof.

8. A printing form precursor comprising:
a supporting substrate; and
a layer of a curable composition adjacent to the supporting substrate, wherein the curable composition comprises a multifunctional urethane, and an initiator, and optionally a reactive diluent, wherein the curable composition has reactive group equivalent weight between 250 and 450 g/equivalent, based upon the multifunctional urethane and the optional reactive diluent, and wherein the initiator is a photoinitiator, and is not an organic epoxide.

9. The printing form precursor of claim 8 wherein the multifunctional urethane has two or more ethylenically unsaturated groups, and the curable composition further comprises one or more reactive diluents having two or more ethylenically unsaturated groups, and the reactive group equivalent weight of the curable composition is the weighted average of the reactive group equivalent weights of the one or more reactive diluents and the multifunctional urethane, and is between 250 and 450 g/equivalent.

10. The printing form precursor of claim 8 wherein the multifunctional urethane is a multifunctional acrylated urethane having two or more (meth)acrylate groups, and the reactive group equivalent weight is an acrylate equivalent weight that is between 250 and 450 g/equivalent.

11. The printing form precursor of claim 8 wherein the curable composition further comprises one or more resin modifiers independently selected from the reactive diluent, monofunctional diluents, monomers, auxiliary resin modifying compounds, or combinations thereof.

12. The printing form precursor of claim 8 wherein the multifunctional urethane comprises one or more multifunctional acrylated urethanes having two or more (meth)acrylate groups, the initiator is a photoinitiator; and the optional reactive diluent comprises one or more reactive diluents having two or more (meth)acrylate groups, and the reactive group equivalent weight of the composition is an acrylate equivalent weight that is the weighted average of the acrylate equivalent weights of the one or more reactive diluents and the multifunctional acrylated urethane, and is between 250 and 450 g/equivalent.

13. The printing form precursor of claim 8 wherein the multifunctional urethane comprises one or more multifunctional acrylated urethanes having two or more (meth)acrylate groups, at least one reactive diluent having two or more (meth)acrylate groups, and an auxiliary resin modifying compound having two or more (meth)acrylate groups, and wherein the reactive group equivalent weight of the curable composition is an acrylate equivalent weight that is the weighted average of the acrylate equivalent weights of the one or more multifunctional acrylated urethanes, the at least one reactive diluent, and the auxiliary resin modifying compound, and is between 250 and 450 g/equivalent.

14. The printing form precursor of claim 8 wherein the curable composition further comprises at least one reactive diluent that has a viscosity of less than or equal to 300 cp and is selected from the group of difunctional (meth)acrylate monomers, difunctional (meth)acrylate oligomers, trifunctional (meth)acrylate monomers, trifunctional (meth)acrylate oligomers, and combinations thereof.

15. A curable multifunctional urethane composition for use as a printing surface in a printing form comprising:
   a) 30 to 95 wt % of at least one multifunctional urethane having two or more reactive groups;
   b) 0.1 to 10 wt % of at least one initiator;
   c) 0 to 40 wt % of one or more reactive diluents having two or more reactive groups;
   d) 0 to 20 wt % of one or more monofunctional diluents;
   e) 0 to 20 wt % of one or more monomers;
   f) 0 to 35 wt % of one or more auxiliary resin modifying compounds; wherein the total of the reactive diluents, monofunctional diluents, monomers, and auxiliary resin modifying compounds is no more than 40 wt % of the curable composition;
   g) 0 to 55 wt % of particulate filler selected from nanoparticles, microparticles, and combinations thereof; and
   optionally, up to 10 wt % total of one or more of additives independently selected from adhesion promotors, slip agents, flow and leveling agents, wetting agents, plasticizers, flexibilizing agents, stabilizers, antioxidants, or dispersants;
   wherein the wt % is based on the total of the solid components in the curable composition; wherein the curable composition has a reactive group equivalent weight of the at least one multifunctional urethane and the one or more reactive diluents and, is 250 to 450 g/equivalent,
   wherein the curable composition forms a cured layer that has a hardness of at least 30 megaPascals on a supporting substrate, the layer having an exterior surface capable of forming cells to carry ink thereby creating the printing surface, and wherein the initiator is a photoinitiator, and is not an organic epoxide.

\* \* \* \* \*